(12) United States Patent
Reilly

(10) Patent No.: US 11,752,810 B2
(45) Date of Patent: Sep. 12, 2023

(54) STEER AXLE PRESSURE MANAGEMENT SYSTEM

(71) Applicant: Airgo IP, LLC, Oklahoma City, OK (US)

(72) Inventor: Benjamin Reilly, Apple Valley, MN (US)

(73) Assignee: Airgo IP, LLC, Oklahoma City, OK (US)

( * ) Notice: Subject to any disclaimer, the term of this patent is extended or adjusted under 35 U.S.C. 154(b) by 407 days.

(21) Appl. No.: 16/947,303

(22) Filed: Jul. 28, 2020

(65) Prior Publication Data

US 2022/0032694 A1 Feb. 3, 2022

(51) Int. Cl.
*B60C 23/00* (2006.01)

(52) U.S. Cl.
CPC .. *B60C 23/00327* (2020.05); *B60C 23/00347* (2020.05); *B60C 23/00354* (2020.05)

(58) Field of Classification Search
CPC ........ B60C 23/00327; B60C 23/00347; B60C 23/00354
See application file for complete search history.

(56) References Cited

U.S. PATENT DOCUMENTS

| | | | |
|---|---|---|---|
| 1,072,907 A | 9/1913 | Brooks |
| 1,083,847 A | 1/1914 | McDowell |
| 1,165,057 A | 12/1915 | Bayly |
| 1,205,504 A | 11/1916 | Bearce |
| 1,827,662 A | 10/1931 | Maas |
| 2,156,841 A | 5/1939 | Davis |
| 2,177,042 A | 10/1939 | Michael |
| 2,242,207 A | 5/1941 | Bowers |
| 2,657,731 A | 11/1953 | Gozzoli |
| 2,849,047 A | 8/1958 | Lamont |
| 2,976,606 A | 3/1961 | Huet |
| 3,276,503 A | 10/1966 | Kilmarx |
| 3,367,722 A | 2/1968 | Miyanaga |
| 3,705,614 A | 12/1972 | Juttner |
| 3,838,717 A | 10/1974 | Wolf |
| 4,154,279 A | 5/1979 | Tsuruta |
| 4,387,931 A | 6/1983 | Bland |
| 4,582,107 A | 4/1986 | Scully |

(Continued)

FOREIGN PATENT DOCUMENTS

WO WO2006034212 3/2006

*Primary Examiner* — Scott A Browne
(74) *Attorney, Agent, or Firm* — Hall Estill Law Firm; Randall K. McCarthy

(57) ABSTRACT

A tire pressure management system includes at least an axle enclosing a pressurized fluid, a hubcap supported by the axle and having an interior and an exterior, a rotary union axially aligned with the axle and mounted to the hubcap, the rotary union includes at least rotary union housing providing a central bore, a fluid conduit having upstream and downstream ends, a first bearing and a second bearing. Each of the bearings are in contact engagement with the fluid conduit via an inner race, and in pressing engagement with a bearing sleeve via an outer race, the bearing sleeve in pressing contact with the central bore; and a first and second seal, the first seal is disposed between the first bearing and the downstream end of the fluid conduit, and the second seal is disposed between the second bearing and the upstream end of the fluid conduit.

20 Claims, 18 Drawing Sheets

(56) References Cited

U.S. PATENT DOCUMENTS

| | | |
|---|---|---|
| 4,641,698 A | 2/1987 | Bitonti |
| 4,685,501 A | 8/1987 | Williams |
| 4,805,681 A | 2/1989 | Vollmer |
| 4,844,138 A | 7/1989 | Kokubu |
| 4,883,106 A | 11/1989 | Schultz |
| 4,924,926 A | 5/1990 | Schultz |
| 5,080,156 A | 1/1992 | Bartos |
| 5,080,157 A | 1/1992 | Oerter |
| 5,174,839 A | 12/1992 | Schultz |
| 5,236,028 A | 8/1993 | Goodell |
| 5,287,906 A | 2/1994 | Stech |
| 5,377,736 A | 1/1995 | Stech |
| 5,398,743 A | 3/1995 | Bartos |
| 5,429,167 A | 7/1995 | Jensen |
| 5,478,974 A | 12/1995 | O'Dea |
| 5,482,358 A | 1/1996 | Kuck |
| 5,538,062 A | 7/1996 | Stech |
| 5,558,408 A | 9/1996 | Naedler |
| 5,584,949 A | 12/1996 | Ingram |
| 5,650,930 A | 7/1997 | Hagenbuch |
| 5,735,364 A | 4/1998 | Kinoshita |
| 5,752,746 A | 5/1998 | Perry |
| 5,767,398 A | 6/1998 | Naedler |
| 5,769,979 A | 6/1998 | Naedler |
| 5,780,782 A | 7/1998 | O'Dea |
| 5,863,057 A | 1/1999 | Wessels |
| 6,037,550 A | 3/2000 | Bradley |
| 6,105,645 A | 8/2000 | Ingram |
| 6,435,238 B1 | 8/2002 | Hennig |
| 6,449,582 B1 | 9/2002 | Chaklader |
| 6,585,019 B1 | 7/2003 | Ingram |
| 6,688,168 B1 | 2/2004 | Elliott |
| 6,803,530 B2 | 10/2004 | Carlstrom |
| 6,921,100 B2 | 7/2005 | Mantini |
| 6,968,882 B2 | 11/2005 | Ingram |
| 6,970,094 B2 | 11/2005 | Yamashita |
| 6,983,883 B2 | 1/2006 | Ridling |
| 7,072,763 B2 | 7/2006 | Saxon |
| 7,302,980 B2 | 12/2007 | Ingram |
| 7,418,989 B2 | 9/2008 | Ingram |
| 7,572,988 B1 | 8/2009 | Morton |
| 7,681,431 B2 | 3/2010 | Roquemore, III |
| 7,705,715 B2 | 4/2010 | Hax |
| 8,374,748 B2 | 2/2013 | Jolly |
| RE45,012 E | 7/2014 | Jones |
| 9,145,559 B2 | 9/2015 | Shaul |
| 9,631,969 B1 | 4/2017 | Whalen |
| 2002/0179345 A1 | 12/2002 | Bell |
| 2003/0060923 A1 | 3/2003 | Scotese |
| 2004/0178005 A1 | 9/2004 | Carlstrom |
| 2004/0187568 A1 | 9/2004 | Locatelli |
| 2005/0133134 A1 | 6/2005 | Ingram |
| 2006/0179929 A1 | 8/2006 | Becker |
| 2009/0187343 A1 | 7/2009 | Koch-Groeber |
| 2010/0045209 A1 | 2/2010 | Daley |
| 2011/0022248 A1 | 1/2011 | McQuade |
| 2013/0325253 A1 | 12/2013 | Watanabe |
| 2014/0032039 A1 | 1/2014 | Dwan |
| 2014/0129046 A1 | 5/2014 | Engstrand |
| 2014/0261939 A1 | 9/2014 | Therber |
| 2015/0034399 A1 | 2/2015 | Clayton |
| 2015/0226598 A1 | 8/2015 | Lawn |
| 2016/0023588 A1 | 1/2016 | Peterson |
| 2016/0031270 A1* | 2/2016 | Wilson ............... B60C 23/007 152/417 |
| 2016/0046299 A1 | 2/2016 | Fung |
| 2016/0257355 A1 | 9/2016 | Siuchta |
| 2017/0030764 A1 | 2/2017 | Lawn |
| 2018/0186208 A1 | 7/2018 | Coombs |
| 2018/0244281 A1 | 8/2018 | Jankowski |
| 2018/0304699 A1* | 10/2018 | Castriotta ......... B60C 23/00354 |

\* cited by examiner

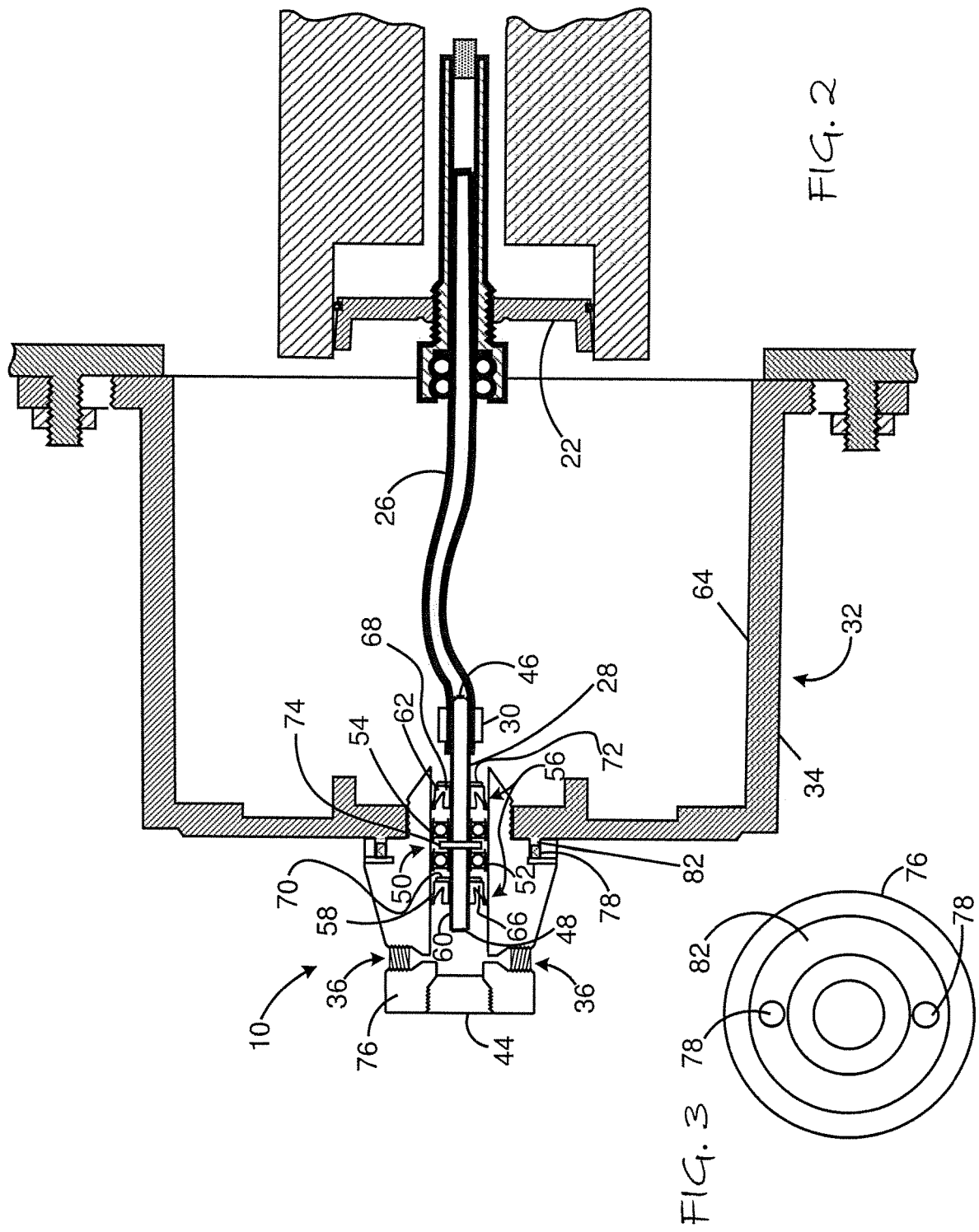

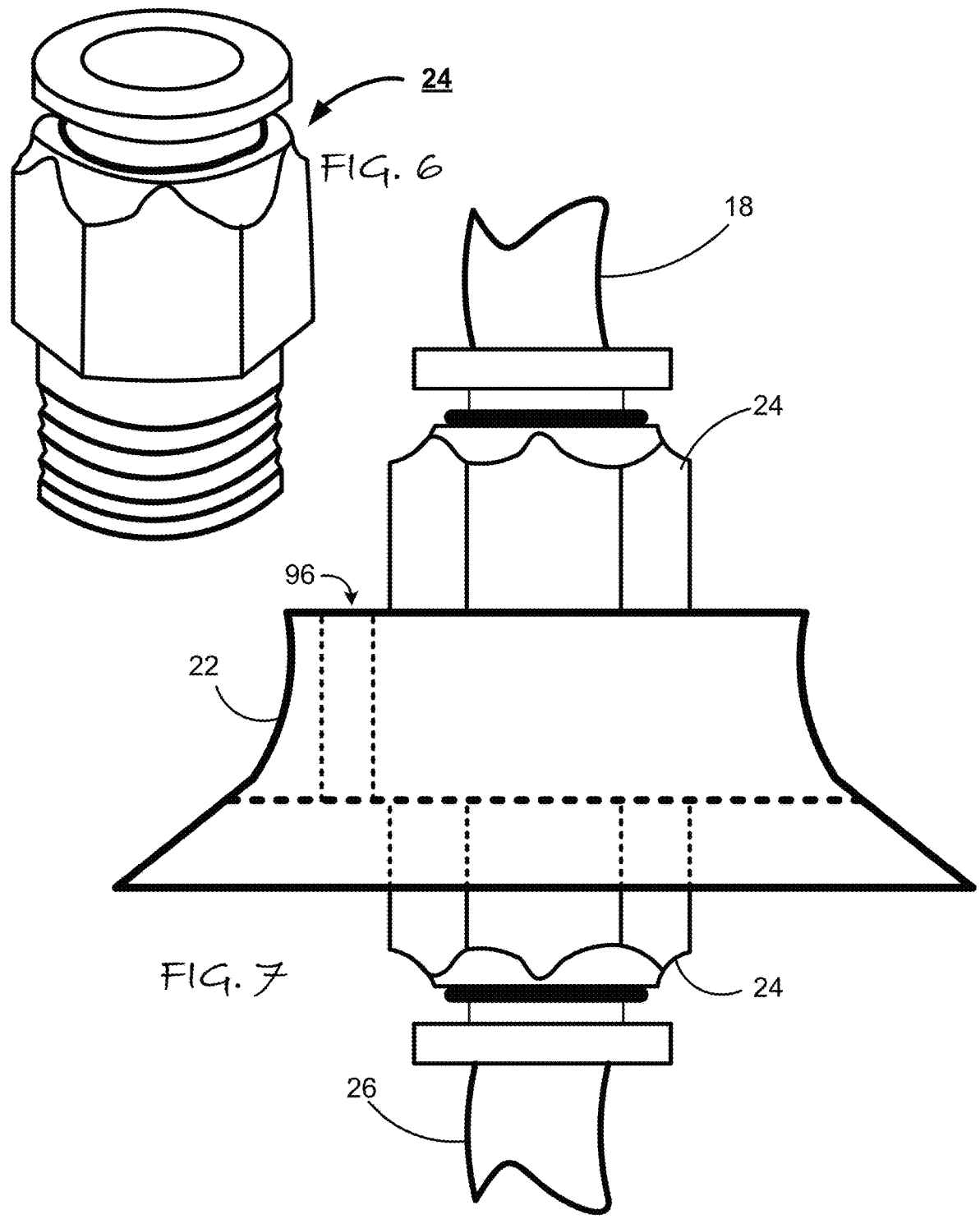

STEER AXLE PRESSURE MANAGEMENT SYSTEM

FIELD OF THE INVENTION

The present invention relates to the field of tire pressure maintenance. More particularly, the present invention relates to the management of tire pressure of tires supporting steer axles of a vehicle, even while the vehicle is traveling along a roadway.

BACKGROUND OF THE INVENTION

The present invention relates to an improved rotary union for use in a central tire pressure management system for automatically maintaining the inflation pressure of the pneumatic tires on moving vehicles such as tractor trailers. Typically, tractor trailers utilize the air compressor on the tractor as a source of pressurized air to activate braking systems. The compressor directs air to the reserve air brake tank on the trailer, which generally corresponds to the range of typical inflation pressures in the tires used on trailers. Air from the reserve air brake tank is first directed to the braking system to maintain the air pressure in the braking system. In conventional tire inflation systems, excess air is directed from the tank through a pressure protection valve to a control box for the tire inflation system. The pressure protection valve only opens to direct the air to the control box when excess air pressure is present, thereby preventing air from being directed to the tire inflation system which is needed for the trailer braking system.

The control box contains a pressure regulator which is set to the cold tire pressure of the particular tires on the trailer so as to supply air to the tires at the desired pressure level in the event of a leak. Air is directed from the control box to the leaking tire through one of the trailer axles, which either carries an air line from the control box, or is sealed and functions as an air conduit. The pressurized air carried by the axles communicates with each pair of trailer tires mounted thereon through a rotary union assembly by which air flow is directed from a stationary air line to the valve stems on the rotating tires. Pressure responsive valves are employed between each rotary union assembly and its associated tires so that upon the occurrence of a leak in one of the tires, the resulting pressure loss will cause one of the valves to open and allow air flow from the rotary union assembly to pass therethrough to the leaking tire.

As tire inflation systems become adopted for broader uses, reliability and ease of maintenance, as well as an ability to manage under inflated as well as over inflated tires have emerged as important demands from the industry, accordingly improvements in apparatus and methods of installing tire inflation systems are needed and it is to these needs the present invention is directed.

SUMMARY OF THE INVENTION

In accordance with preferred embodiments, a tire pressure management system includes at least an axle housing enclosing a pressurized fluid, a hubcap supported by the axle and having an interior and an exterior, and a rotary union axially aligned with the axle and mounted to the hubcap from the exterior of the hubcap. Preferably, the rotary union including at least a rotary union housing providing a central bore, a fluid conduit, the fluid conduit having a downstream end and an upstream end, a pair of bearings, each of the pair of bearings providing an inner race and an outer race, each inner race of the pair of bearings is preferably in mating communication with the fluid conduit, via the inner race, and in pressing engagement with a bearing sleeve via an outer race, the bearing sleeve in pressing contact with the central bore. The first bearing of the pair of bearings is preferably adjacent the downstream end of said fluid conduit, and a second bearing of the pair of bearings is preferably adjacent the upstream end of the fluid conduit.

Preferably, the tire pressure management system further includes at least a pair of fluid seals, a first seal of the pair of fluid seals engage an external surface of the fluid conduit and is preferably disposed between the first bearing and the downstream end of the fluid conduit, and a second seal of the pair of fluid seals engaging the external surface of the fluid conduit and is preferably disposed between the second bearing and the upstream end of the fluid conduit.

These and various other features and advantages that characterize the claimed invention will be apparent upon reading the following detailed description and upon review of the associated drawings.

BRIEF DESCRIPTION OF THE DRAWINGS

The present invention is illustrated by way of example and not limitation in the figures of the accompanying drawings, in which like references indicate similar elements and in which:

FIG. 2 is a sectional side view of the rotary union assembly of the present novel tire pressure management system and associated axle spindle.

FIG. 3 is bottom plan view of the rotary union assembly of the present novel tire pressure management system.

FIG. 6 is a view in perspective of a push to connect fluid fitting of the rotary union assembly of FIG. 1.

FIG. 7 is a side elevation view of a pair of push to connect fluid fittings of the present novel tire pressure management system of FIG. 1.

DESCRIPTION OF PREFERRED EMBODIMENTS

Figure 1:
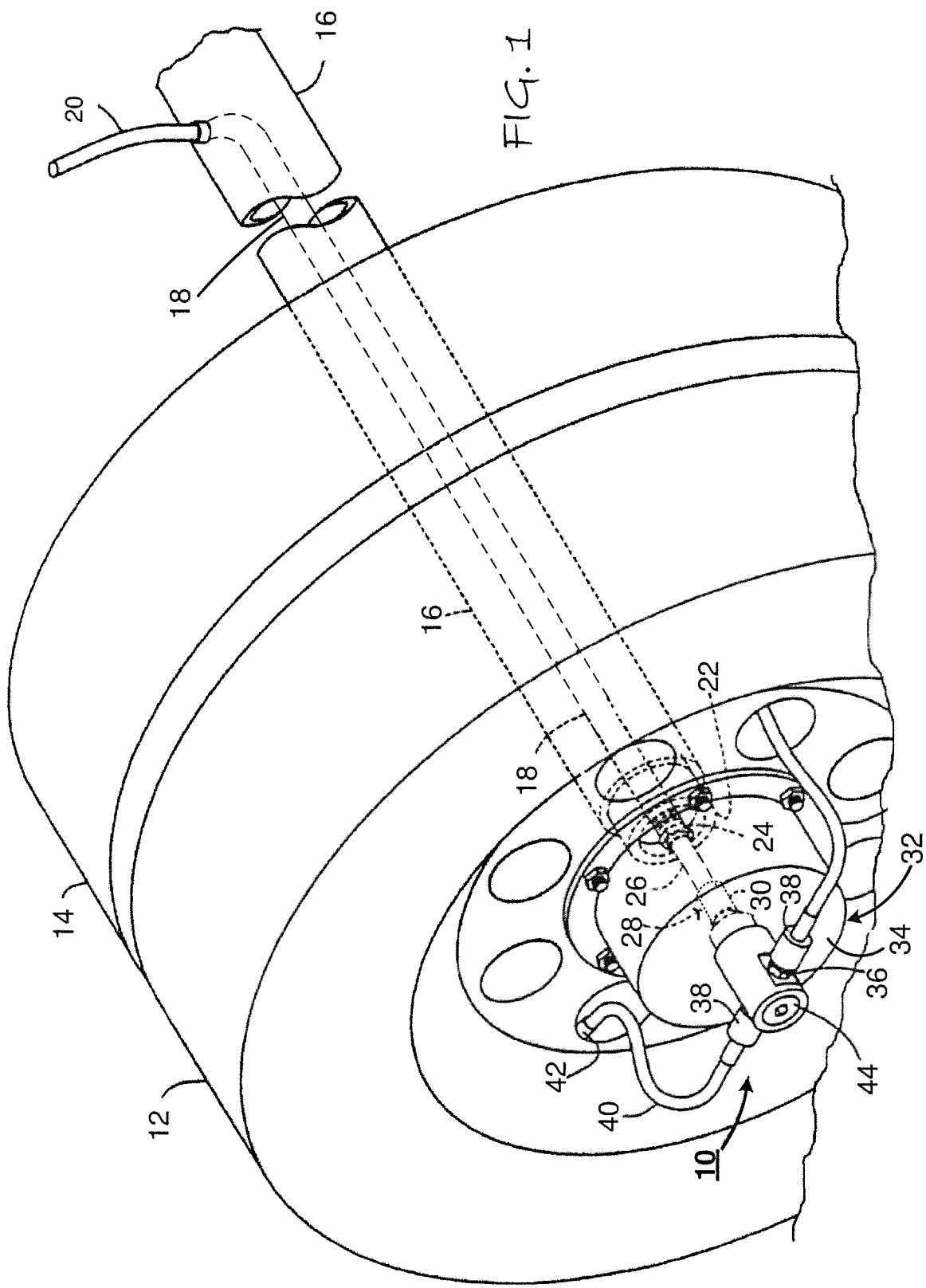
FIG. 1 is a partial perspective view of a rotary union assembly of the present novel tire pressure management system shown secured to an outer wheel of a pair of tractor trailer tires mounted on a stationary axle.

It will be readily understood that elements of the present invention, as generally described and illustrated in the Figures herein, could be arranged and designed in a wide variety of different configurations. Referring now in detail to the drawings of the preferred embodiments, the rotary union assembly 10 (also referred to herein as assembly 10, and rotary union 10) of the first preferred embodiment, while useable on a wide variety of movable vehicles employing stationary axles for automatically maintaining the inflation pressure of the pneumatic tires thereon, is particularly adapted for use on tractor trailers. Accordingly, the assembly 10 of the first preferred embodiment will be described in conjunction with a pair of adjacent vehicle tires 12 and 14 mounted on a stationary tractor trailer axle 16 (also referred to herein as trailer axle 16, and axle 16). While identical rotary union assemblies 10 are provided at the end of each axle on the trailer to maintain the inflation pressure of the tires carried thereby, in each: the preferred embodiment; the alternate preferred embodiment; and the alternative preferred embodiment, reference will be made to only one such assembly and the pair of tires it services.

Preferably, the trailer axle 16 which carries tires 12 and 14 is sealed and functions as a source for pressurized fluid, else houses an air supply line 18 to supply air to the rotary union assembly 10. A fluid supply line 20 preferably provides air under pressure to the interior of the axle 16, else to an air supply line 18, from the conventional air compressor on the tractor via a standard pressure protection valve and control box (not shown) to pressurize the axle 16, else to pressurize the air supply line 18, at the cold tire pressure of the trailer tires. FIG. 1 further shows that the axle 16 supports an axle plug 22, which in turn supports a push to connect fluid fitting 24. Preferably, the push to connect fluid fitting 24 is attached to and in fluid communication with a fill tube 26, which in a preferred embodiment is a flexible fill tube 26. Preferably, the flexible fill tube 26 is connected to a fluid conduit 28, which supplies pressurized air to the rotary union assembly 10. Preferably, the flexible fill tube 26 is secured to the fluid conduit 28, by a compression fitting 30. As those skilled in the art would know, a compression fitting, or alternate mechanical means, could serve the function of the push to connect fluid fitting 24.

In a preferred embodiment, the rotary union assembly 10 is mounted to a hubcap 32, from an exterior 34 of the hubcap 32, and provides pressurized air, by way of an air delivery channel 36, to tire pressure hose fittings 38 that are secured to tire pressure hoses 40. Each tire pressure hose 40 supplies the pressurized air to tire valve stems 42 of tires 12 and 14. Preferably, the rotary union assembly 10 provides a removable seal access cover 44, which mitigates escapement of pressurized fluid from the air delivery channel 36, the tire pressure hoses 40, and the tires 12 and 14.

As seen in FIGS. 2 and 3, the fluid conduit 28 provides a downstream end 48 and an upstream end 46, and the rotary union assembly 10 further preferably includes a pair of bearings 50, in which each of the pair of bearings 50 provides an inner race and an outer race. In a preferred embodiment, a first bearing 52, of the pair of bearings 50, is adjacent the downstream end 48, of the fluid conduit 28, while the second bearing 54, of the pair of bearings 50, is adjacent the upstream end 46, of the fluid conduit 28.

FIG. 2 further shows that in a preferred embodiment, the rotary union assembly 10, further includes a pair of fluid seals 56, with a first fluid seal 58, is preferably disposed between the first bearing 52, and the downstream end 48 of the fluid conduit 28, while the second fluid seal 62, of the pair of fluid seals 56, is preferably disposed between the second bearing 54, and the upstream end 46, of the fluid conduit 28. In a preferred embodiment, the second fluid seal 62 mitigates transfer of an environment contained within an interior 64, of the hubcap 32, from entry into the pair of bearings 50.

FIG. 2 further shows that in a preferred embodiment, each of the pair of fluid seals 56 (58 and 62), provide a base portion (66 and 68 respectfully), and the rotary union assembly 10, further includes: a first fluid seal restraint 70, which is disposed between the first bearing 52, and the base portion 66 of the first fluid seal 58, and in pressing engagement with the external surface 60 of the fluid conduit 28; and a second fluid seal restraint 72, which is disposed between the base portion 68 of the second fluid seal 62, and in pressing engagement with the external surface 60 of the fluid conduit 28. FIG. 2 still further shows that the rotary union 10, preferably includes a bearing spacer 74, disposed between the first bearing 52 and the second bearing 54 of the pair of bearings 50. The bearing spacer 74 provides stability of the first and second bearings (52, 54) during the process of pressing the pair of bearings 50 into a rotary union housing 76, of the rotary union assembly 10.

As discussed hereinabove, in a preferred embodiment, the second fluid seal 62, mitigates transfer of an environment contained within an interior 64, of the hubcap 32, from entry into the pair of bearings 50. However, if the environment within the hubcap 32 elevates in pressure, a spring loaded pressure relief valve 78 (such as a poppet valve), else a pressure relief seal 80 (of FIG. 9) also referred to herein as a pressure equalization structure 80 (of FIG. 11), confined by an excess pressure collection chamber 82 (which is provided by the rotary union housing 76, and is in contact adjacency with the exterior 34, of the hubcap 32, and shown by FIGS.

2 and 3), activates to relieve the pressure present in the pressure collection chamber 82, to atmosphere. That is, when the pressure contained by the pressure collection chamber 82 reaches a predetermined pressure level, which in a preferred embodiment is in the range of 5 to 8 PSI.

Figure 4:
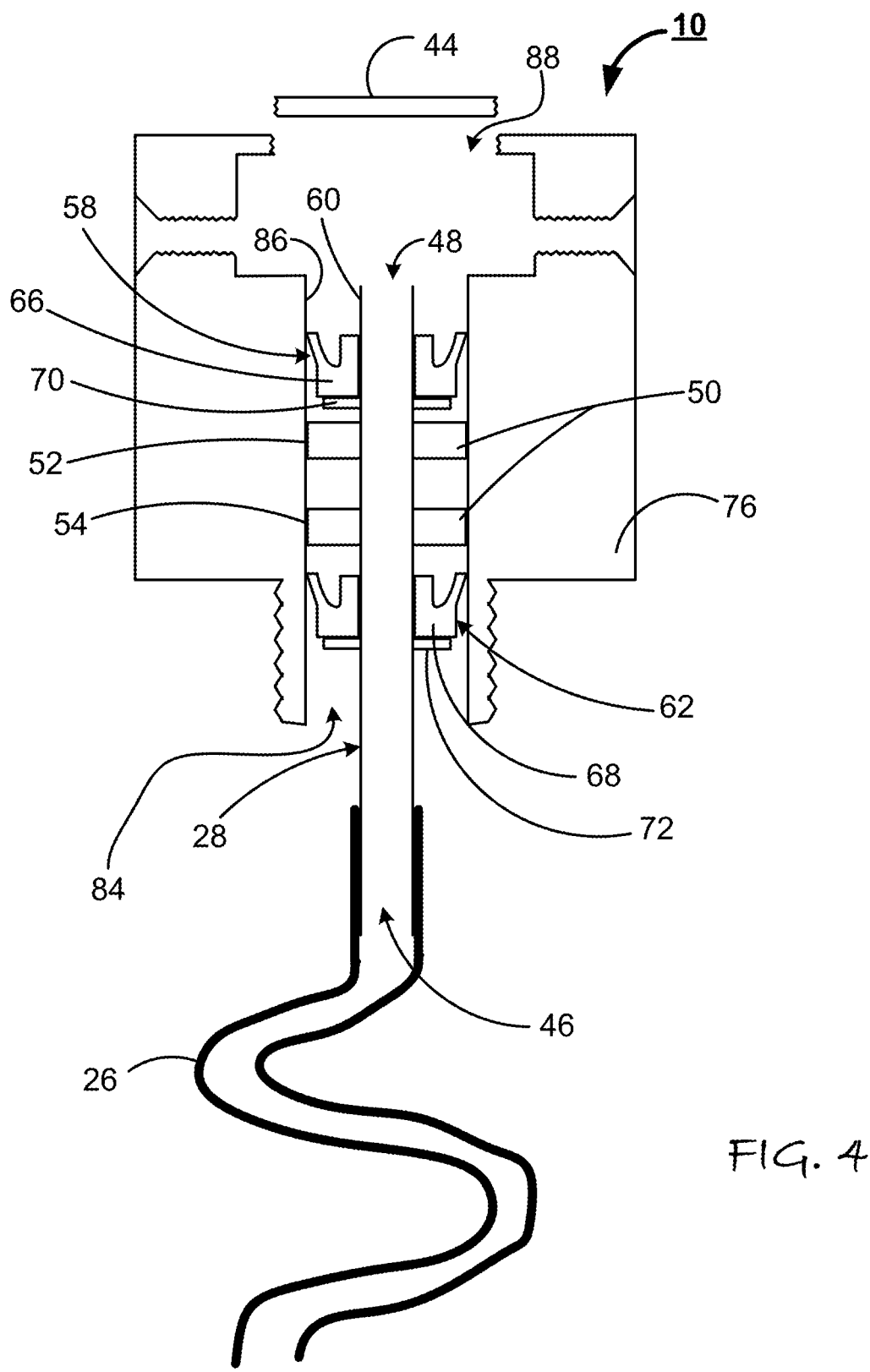
FIG. 4 is a cross-sectional side view of the rotary union housing, air lines and associated seals preferably employed by the present novel tire pressure management system.

FIG. 4 shows a preferred embodiment that preferably includes at least the rotary union housing 76, supporting and confining the fluid conduit 28, within a central bore 84 (also referred to herein as channel 84), of the rotary union housing 76. The fluid conduit 28 preferably provides the downstream end 48 and the upstream end 46. Further shown by FIG. 4 is the pair of bearings 50; each of the pair of bearings 50 provides an inner race and an outer race. Each inner race of the pair of bearings 50, is in pressing communication with the external surface 60, of the fluid conduit 28, and each outer race of the pair of bearings 50, is in pressing communication with a bore surface 86 (also referred to herein as wall 86), of the central bore 84, of the rotary union housing 76. The first bearing 52, of the pair of bearings 50, is adjacent the downstream end 48, of the fluid conduit 28, and the second bearing 54, of the pair of bearings 50, is adjacent the upstream end 46, of the fluid conduit 28.

FIG. 4 further shows that in a preferred embodiment, the rotary union 10 preferably includes a pair of fluid seals 56, the first fluid seal 58, of the pair of fluid seals 56, engages the external surface 60, of the fluid conduit 28, and is disposed between the first bearing 52, and the downstream end 48, of said fluid conduit 28. The second fluid seal 62, of the pair of fluid seals 56, engages the external surface 60 of the fluid conduit 28, and is disposed between said second bearing 54, and the upstream end 46, of the fluid conduit 28. In a preferred embodiment, the first fluid seal 58 provides the base portion 66, and the first fluid seal restraint 70, which is in pressing contact with the external surface 60 of the fluid conduit 28, abuts against the base portion 66, of the first fluid seal 58, to maintain the relative position of the first fluid seal 58, adjacent the bore surface 86, of the central bore 84; and the second fluid seal 62, provides the base portion 68, and the second fluid seal restraint 72, which is in pressing contact with the external surface 60 of the fluid conduit 28, abuts against the base portion 68, of the second fluid seal 62, to maintain the relative position of the second fluid seal 62, adjacent the bore surface 86, of the central bore 84. In a preferred embodiment, the rotary union housing 76 further provides a fluid distribution chamber 88 (also referred to herein as a fluid chamber 88), which is in fluid communication with the downstream end 48, of the fluid conduit 28. The fluid chamber 88, receives pressurized air from the fluid conduit 28, and transfers the received pressurized air to the tires 12 and 14 (of FIG. 1).

Figure 5:
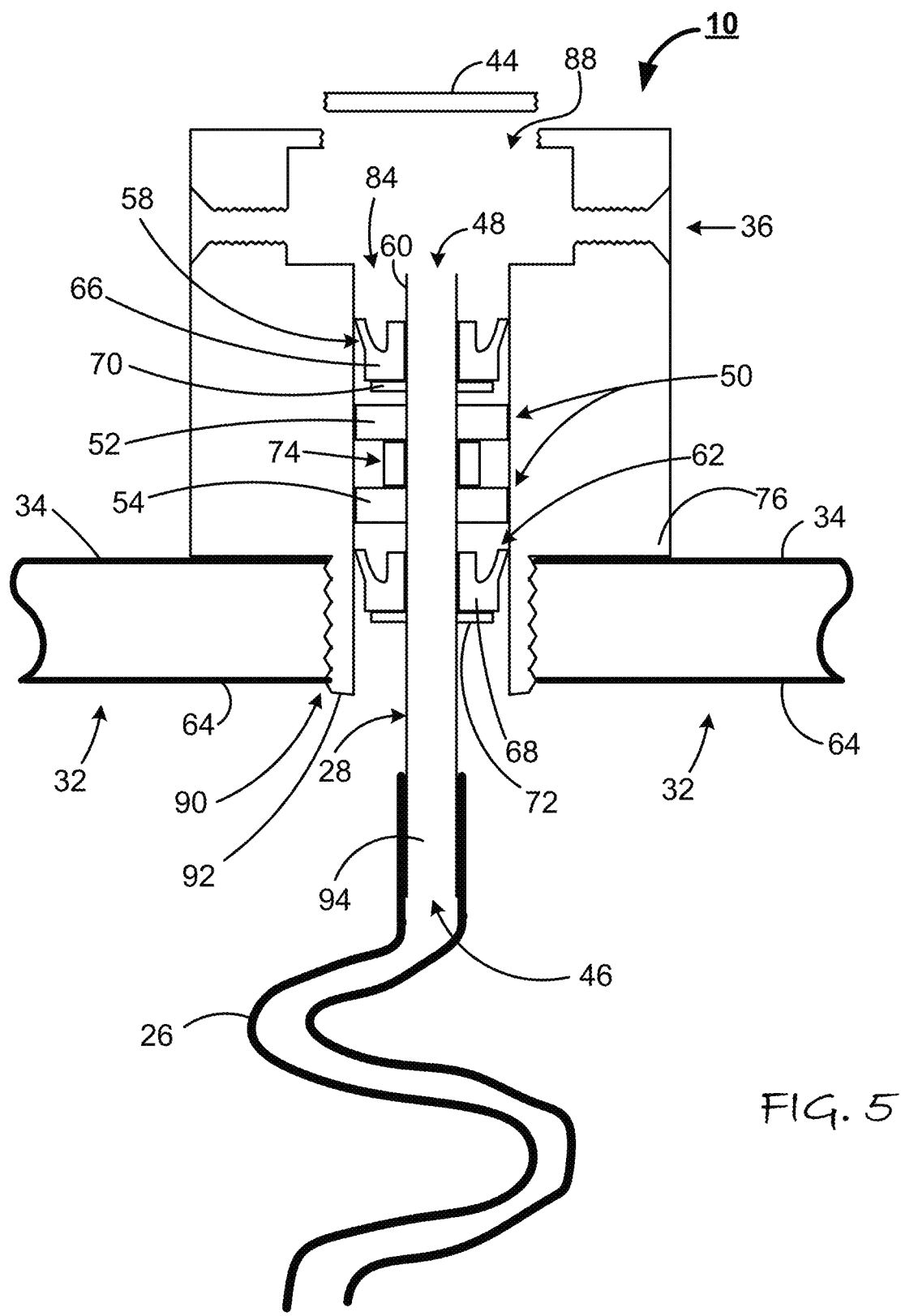
FIG. 5 is a cross-sectional side view of an alternate rotary union assembly of the present novel tire pressure management system and its associated bearings and bearing spacer.

FIG. 5 shows that in a preferred embodiment, the hubcap 32 provides an attachment aperture 90. The attachment aperture 90 is preferably disposed between the interior 64 and the exterior 34, of the hubcap 32. The attachment aperture 90 provides an axis of rotation, which is preferably substantially aligned with an axis of the axle 16 (of FIG. 1). Additionally, the rotary union housing 76 provides at least an attachment member 92, which preferably is in mating communication with the attachment aperture 90. FIG. 5 further shows that the fluid conduit 28 provides a fluid communication portion 94, which extends beyond the attachment member 92, and into the interior of said hubcap 32.

FIGS. 6 and 7 show the push to connect fluid fitting 24, of a preferred embodiment. The push to connect fitting, model No. 1868X4 by Eaton Weatherhead, of Maumee, Ohio is an example of a push to connect fitting of the type found useful in a preferred embodiment. FIG. 7 shows that in a preferred embodiment, two push to connect fluid fittings 24, are secured to the axle plug 22. In a preferred embodiment, one of the pair of push to connect fluid fittings 24 is in fluid communication with the air supply line 18, while the other is in fluid communication with the fill tube 26. FIG. 7 shows that in a preferred alternate embodiment, the axle plug 22, provides a pressure transfer conduit 96, which is used to disburse pressurized air, which may accumulate in the interior 64, of the hubcap 32 (both of FIG. 4), back into the axle housing 16, when the air supply line 18, is utilized to convey pressurized air to the rotary union 10 (of FIG. 2).

Figure 8:
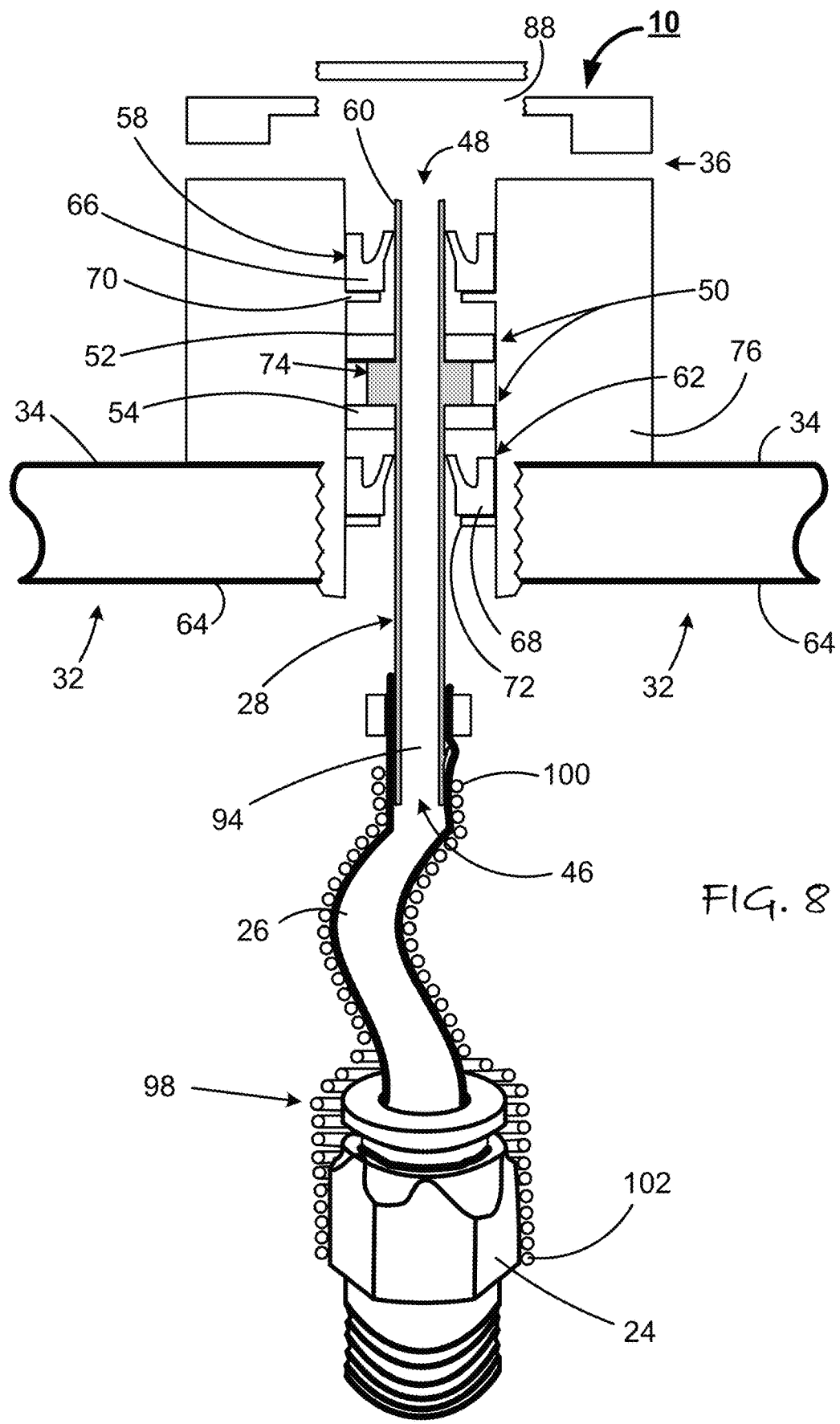
FIG. 8 is a cross-section view of the rotary union housing of an alternative rotary union assembly of the present novel tire pressure management system showing an anti-rotational means.

FIG. 8 depicts an alternate preferred embodiment of the present invention, in which the fluid conduit 28, provides the bearing spacer 74, and the rotary union housing 76 provides the first fluid seal restraint 70. Additionally, in a preferred embodiment, the fill tube 26 is a flexible fill tube formed from a polymer, such as a polyurethane based material, else a metallic material, such as a shape memory alloy. FIG. 8 further shows that when the flexible fill tube 26 is connected to the push to connect fluid fitting 24, an anti-rotational means 98 is incorporated into the rotary union 10. Preferably, the anti-rotational means 98 has a first end 100, and a second end 102. The first end 100 of the anti-rotational means 98, is secured to the flexible fill tube 26, adjacent the fluid communication portion 94. The second end 102, of the anti-rotational means 98, connects to the push to connect fluid fitting 24. Preferably, the anti-rotational means 98 mitigates rotation of the fill tube 26, when the rotary union housing 76, in conjunction with the hubcap 32, rotates about the fluid conduit 28. By example, but not by limitation, a coiled spring has been found useful as the anti-rotational means 98, in an alternate example, but not by way of limitation, a torsion bar 104 (of FIG. 9) has been found useful to serve as an anti-rotational means 98. However, as those skilled in the art will appreciate, any of a host of mechanical structures, which serve to mitigate rotation of the fill tube 26, when the rotary union housing 76, in conjunction with the hubcap 32, rotates about the fluid conduit 28 may be employed to serve this purpose.

Figure 9:
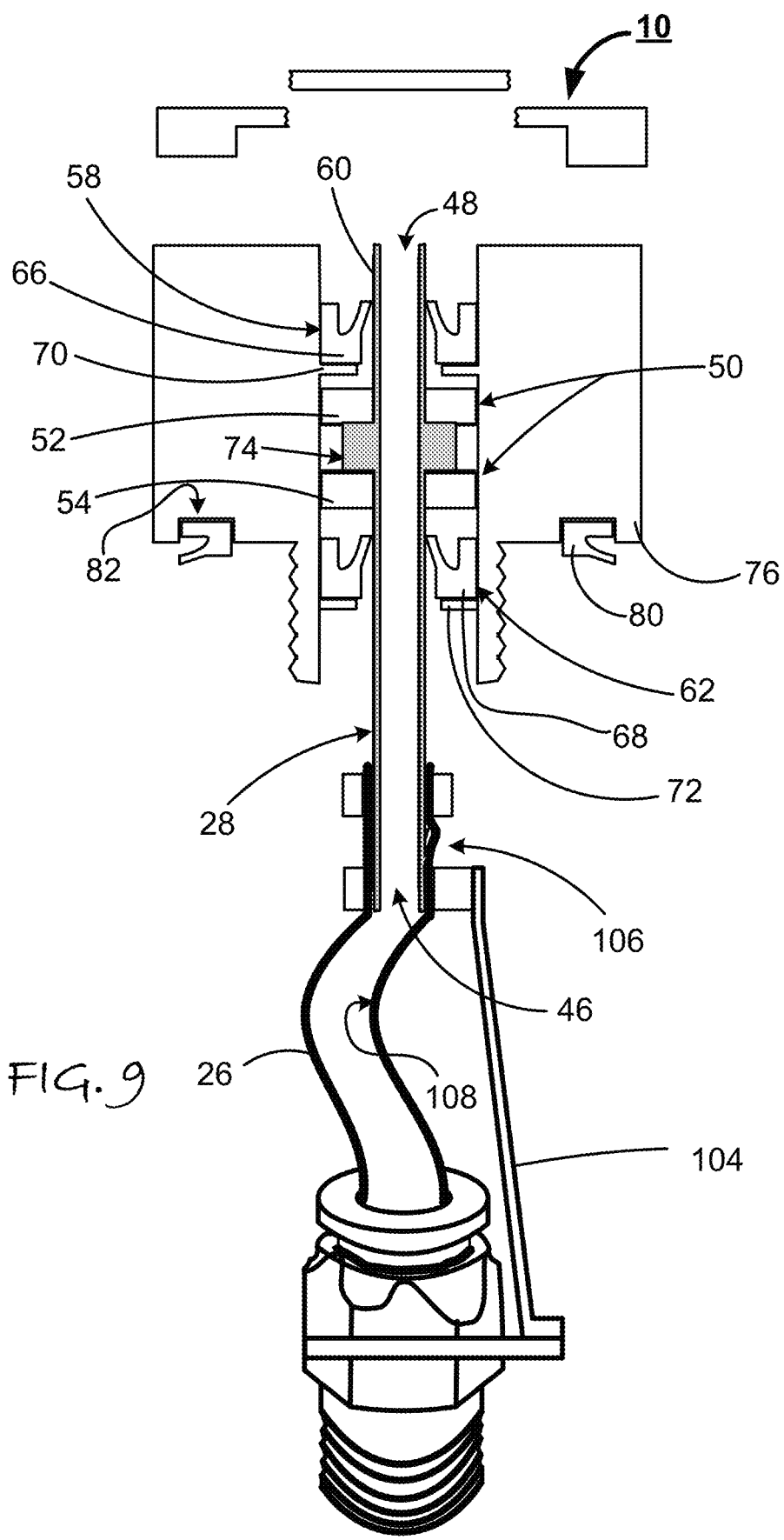
FIG. 9 is a cross-section view of the rotary union housing of the alternative rotary union assembly of FIG. 8, of the present novel tire pressure management system showing an alternate anti-rotational means.

In an alternate preferred embodiment, in addition to the fluid chamber 88, the rotary union housing 76, further provides the air delivery channel 36, which is in fluid communication with, and extending radially from, said fluid chamber 88, as shown by FIG. 8, the fluid conduit 28, further provides a retention barb 106, protruding from the fluid conduit 28, and communicating with an interior surface 108, of said flexible fill tube 26. The retention barb 106, mitigates an inadvertent removal of said flexible fill tube 26, from the fluid conduit 28. The retention barb 106, is preferably positioned adjacent to, and downstream from the compression fitting 30, as shown by FIG. 9.

Figure 10:
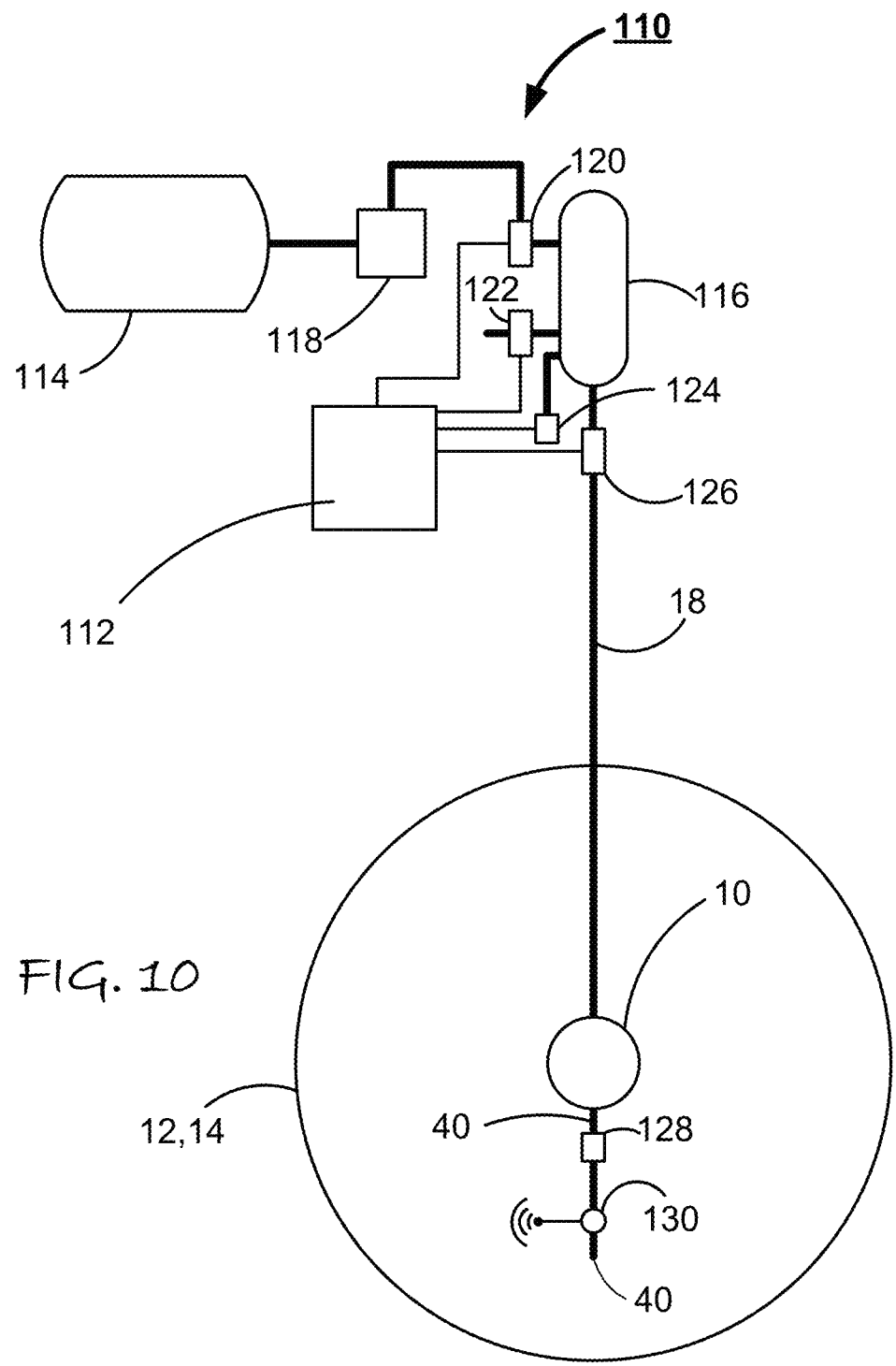
FIG. 10 is a block diagram of the present novel tire pressure management system of FIG. 1.

FIG. 10 shows a tire pressure management system 110, which preferably includes at least a fluid pressure controller 112, which in a preferred embodiment controls the flow of pressurized air into and out of the tires 12 and 14. The source of the pressurized air is a trailer air tank 114. The trailer air tank 114, is in fluidic communication with a tire pressure tank 116. The pressurized air from the trailer air tank 114 passes through an air regulator 118, and then through an air inlet control valve 120, operating under the control of the fluid pressure controller 112. In a preferred embodiment, the tire pressure management system 110, further includes at least: an air outlet valve 122, in fluid communication with the tire pressure tank 116, and under the control of the fluid pressure controller 112; a tire pressure tank pressure gauge 124, in fluid communication with the tire pressure tank 116, and in electronic communication with the fluid pressure controller 112; and an air pressure supply valve 126, in fluid communication with the tire pressure tank 116, and under the control of the fluid pressure controller 112. Preferably, the air pressure supply valve 126, supplies pressurized air to, or conversely, receives pressurized air from the air supply line 18, depending on whether the pressure in the tire (12,14), is above or below a desired pressure level.

In a preferred embodiment, pressurized air that flows into or out of the rotary union 10, is modulated by a dual flow control valve 128. Preferably, the dual flow control valve 128, responds to air pressure supplied by the air supply line 18, by opening a spring loaded valve member, which allows pressurized air to flow out of the tire (12,14), when the pressure in the tire (12,14), is greater than the air pressure in the air supply line 18. Conversely, the dual flow control valve 128, promotes the flow of pressurized air into the tire (12,14), when the pressure level within the tire 12,14 is less than the air pressure in the air supply line 18.

FIG. 10 further shows that the tire pressure management system 110, further preferably includes a tire pressure monitoring sensor 130, disposed between the dual flow control valve 128, and the tire (12,14), and in electronic communication with the fluid pressure controller 112. In a preferred embodiment, the tire pressure monitoring sensor 130, measures the level of pressure within the tire (12,14), and relays the measured pressure level to the fluid pressure controller 112. The fluid pressure controller 112, compares the measured pressure level within the tire (12,14) to a target pressure, maintains the pressure available in the tire pressure tank 116 at the target level, and directs the air pressure supply valve 126, to release pressurized air to the dual flow control valve 128, which activates to promote either inflation, or deflation of the tire (12,14), to bring the pressure level within the tire (12,14) into balance with the target pressure level. Once the desired pressure level within the tire (12,14) is achieved, as measured by the tire pressure monitoring sensor, the fluid pressure controller 112, directs the air pressure supply valve 126, to disengage.

In a preferred embodiment, the fluid pressure controller 112, operates both the air outlet valve 122, and the air inlet control valve 120, to maintain the pressure within the tire pressure tank 116, at a predetermined pressure level. For example, but not by way of limitation, if the tire pressure of the tires (12,14) is above the target pressure level, the fluid pressure controller 112, will crack open the air outlet valve 122, to allow relief of pressure from the system; and if the tire pressure of the tires (12,14) is below the target pressure level, the fluid pressure controller 112, will crack open the air inlet control valve 120, to allow pressure to build in the system.

Figure 11:
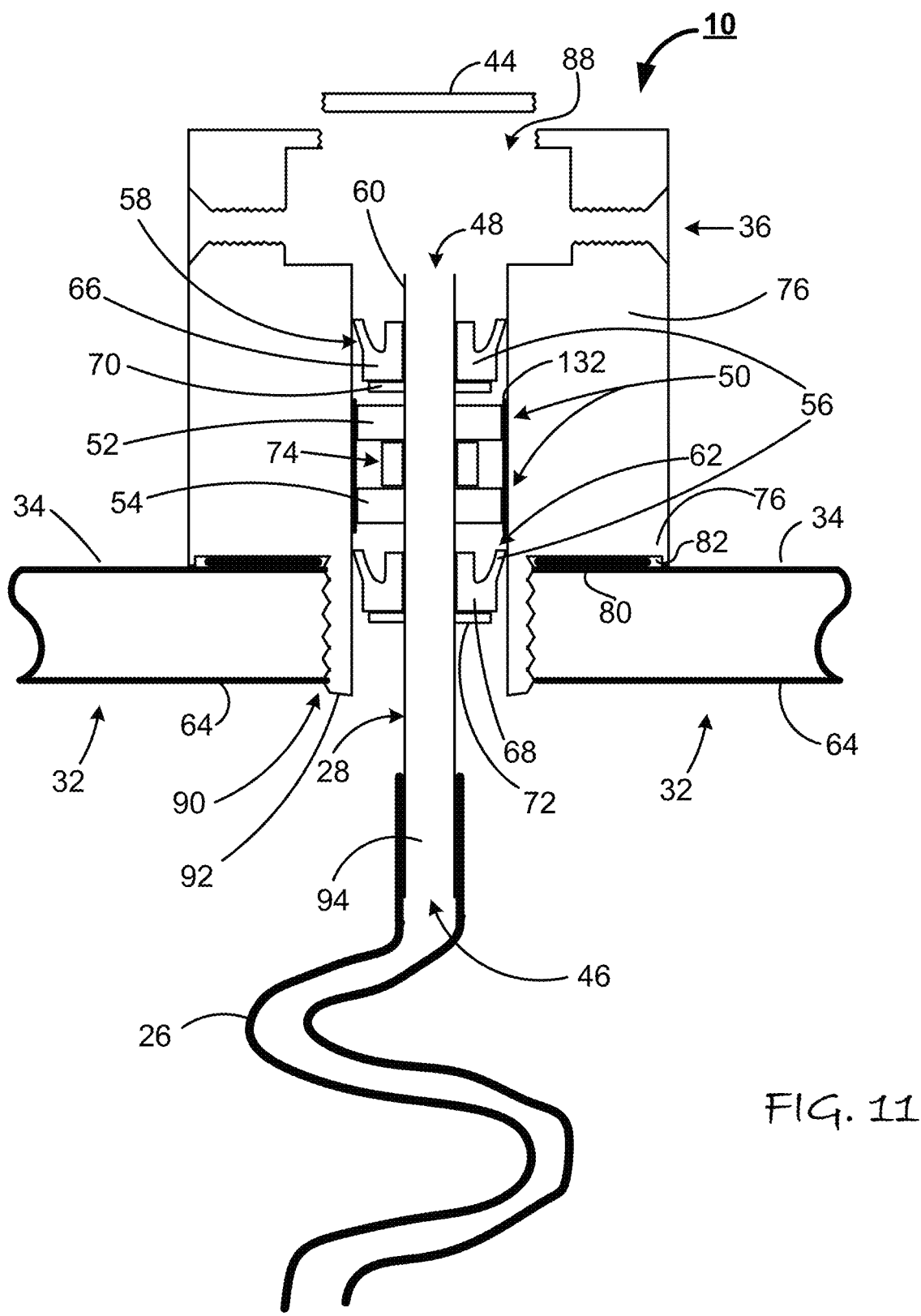
FIG. 11 is a cross-sectional side view of the rotary union housing, air lines, bearing sleeve, and associated seals preferably employed by the present novel tire pressure management system.

FIG. 11 shows a preferred embodiment that preferably includes at least the rotary union housing 76, supporting and confining the fluid conduit 28, within a central bore 84 (also referred to herein as channel 84 of FIG. 4), of the rotary union housing 76. The fluid conduit 28 preferably provides the downstream end 48 and the upstream end 46. Further shown by FIG. 4 is the pair of bearings 50; each of the pair of bearings 50 provides an inner race and an outer race. Each inner race of the pair of bearings 50, is in pressing communication with the external surface 60, of the fluid conduit 28, and each outer race of the pair of bearings 50, is in pressing communication with a bore surface 86 (also referred to herein as wall 86), of the central bore 84, of the rotary union housing 76. The first bearing 52, of the pair of bearings 50, is adjacent the downstream end 48, of the fluid conduit 28, and the second bearing 54, of the pair of bearings 50, is adjacent the upstream end 46, of the fluid conduit 28.

FIG. 11 further shows that in a preferred embodiment, the rotary union 10 preferably includes a pair of fluid seals 56, the first fluid seal 58, of the pair of fluid seals 56, engages the external surface 60, of the fluid conduit 28, and is disposed between the first bearing 52, and the downstream end 48, of said fluid conduit 28. The second fluid seal 62, of the pair of fluid seals 56, engages the external surface 60 of the fluid conduit 28, and is disposed between said second bearing 54, and the upstream end 46, of the fluid conduit 28. In a preferred embodiment, the first fluid seal 58 provides the base portion 66, and the first fluid seal restraint 70, which is in pressing contact with the external surface 60 of the fluid conduit 28, abuts against the base portion 66, of the first fluid seal 58, to maintain the relative position of the first fluid seal 58, adjacent the bore surface 86, of the central bore 84; and the second fluid seal 62, provides the base portion 68, and the second fluid seal restraint 72, which is in pressing contact with the external surface 60, of the fluid conduit 28, abuts against the base portion 68, of the second fluid seal 62, to maintain the relative position of the second fluid seal 62, adjacent the bore surface 86, of the central bore 84. In a preferred embodiment, the rotary union housing 76 further provides a fluid distribution chamber 88 (also referred to herein as a fluid chamber 88), which is in fluid communication with the downstream end 48, of the fluid conduit 28. The fluid chamber 88, receives pressurized air from the fluid conduit 28, and transfers the received pressurized air to the tires 12 and 14 (of FIG. 1). Additionally, the rotary union housing 76 provides at least the attachment member 92, which preferably is in mating communication with the attachment aperture 90 of the hubcap 32, and further shows that the fluid conduit 28 provides a fluid communication portion 94, which extends beyond the attachment member 92, and into the interior of said hubcap 32.

In a preferred embodiment, the rotary union 10 preferably includes a bearing sleeve 132, and the bearing sleeve 132, is preferably in pressing contact with the central bore 84, or may be joined to the central bore 84, of the rotary union housing 76, by means of the use of an adhesive, weld, solder, or other mechanical joint techniques, such as through an insert molding process.

Preferably, the pair of bearings 50, each provide an inner race and an outer race, each inner race of the pair of bearings 50, is preferably in direct contact adjacency with the external surface 60, of the fluid conduit 28, while the outer race of each of the pair of bearings 50 are preferably in pressing communication with the internal surface of the bearing sleeve 132. The bearing sleeve 132 may be formed from a composite material; a metallic material (such as, but not limited to brass, aluminum, stainless steel, iron or steel); or from a polymeric materials (such as, but not limited to nylon, Delran™, phenolic, or Teflon™).

As further shown by FIG. 11, an excess pressure collection chamber 82, is provided by the rotary union housing. The excess pressure collection chamber 82, is preferably adjacent the exterior 34, of the hubcap 32, and serves to accommodate a pressure equalization structure 80. The pressure equalization structure 80, is preferably disposed within the excess pressure collection chamber 82, and in contact adjacency with the exterior 34, of the hubcap 32. As is shown in FIGS. 9 and 11, the mechanical configuration of the cooperation between the pressure equalization structure 80, and the excess pressure collection chamber 82 may take on a plurality of forms.

Figure 12:
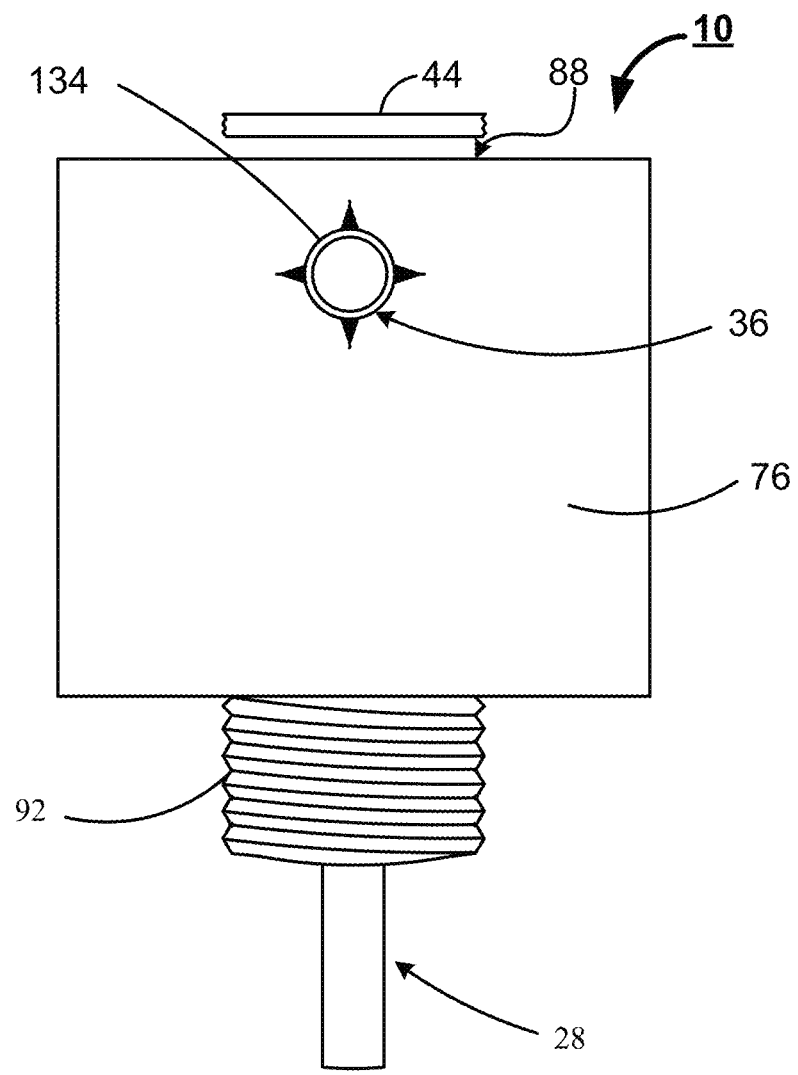
FIG. 12 is a side view in elevation of a rotary union housing formed from a polymer, and providing a threaded insert molded into the polymer rotary housing.

FIG. 12 shows a side view in elevation of a rotary union housing 76, formed from a polymeric materials (such as, but not limited to nylon, Delran™, phenolic, or Teflon™), and providing a threaded insert 134, the threaded insert 134 molded into the polymer rotary housing 76, confined within the air delivery channel 36, and in fluidic communication with the fluid chamber 88.

Figure 13:
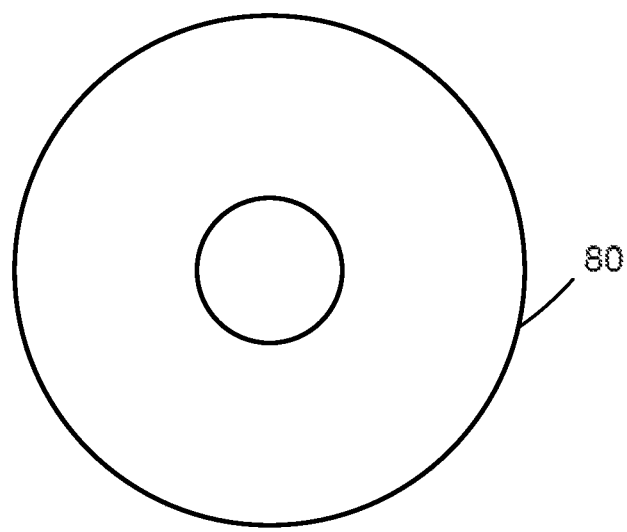
FIG. 13 is a top plan view of a pressure equalization structure of FIG. 11.

FIG. 13 shows a top plan view of the pressure equalization structure 80 of FIG. 11. In a preferred embodiment, the pressure equalization structure 80 is a filter material (of metal, fiber, or polymer, such as, but not limited to spun bonded polypropylene) as a top layer, and a bottom layer is preferably formed from flashspun high-density polyethylene fibers that promotes the transfer of air, while mitigating the transfer of dirt and water.

Figure 14:
FIG. 14 is a side view in elevation of an embodiment of the pressure equalization structure of FIG. 13.
Figure 15:
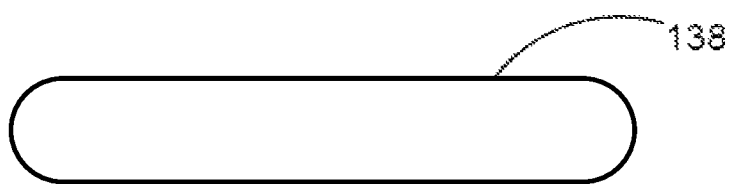
FIG. 15 is a side view in elevation of an alternate embodiment of the pressure equalization structure of FIG. 13.
Figure 16:
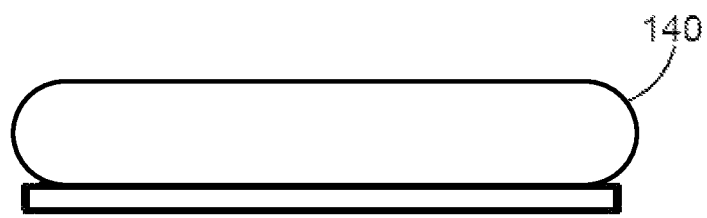
FIG. 16 is a side view in elevation of an alternative embodiment of the pressure equalization structure of FIG. 13.

FIG. 14 shows a side view in elevation of a preferred component of the bottom layer 136, of the pressure equalization structure 80, of FIG. 13. While FIG. 15 shows a side view in elevation of a preferred component of the top layer 138, of the pressure equalization structure 80, of FIG. 13. And FIG. 16 shows a side view in elevation of a combination 140, of the preferred bottom layer 136, applied to an external surface of the top layer 138.

Figure 17:
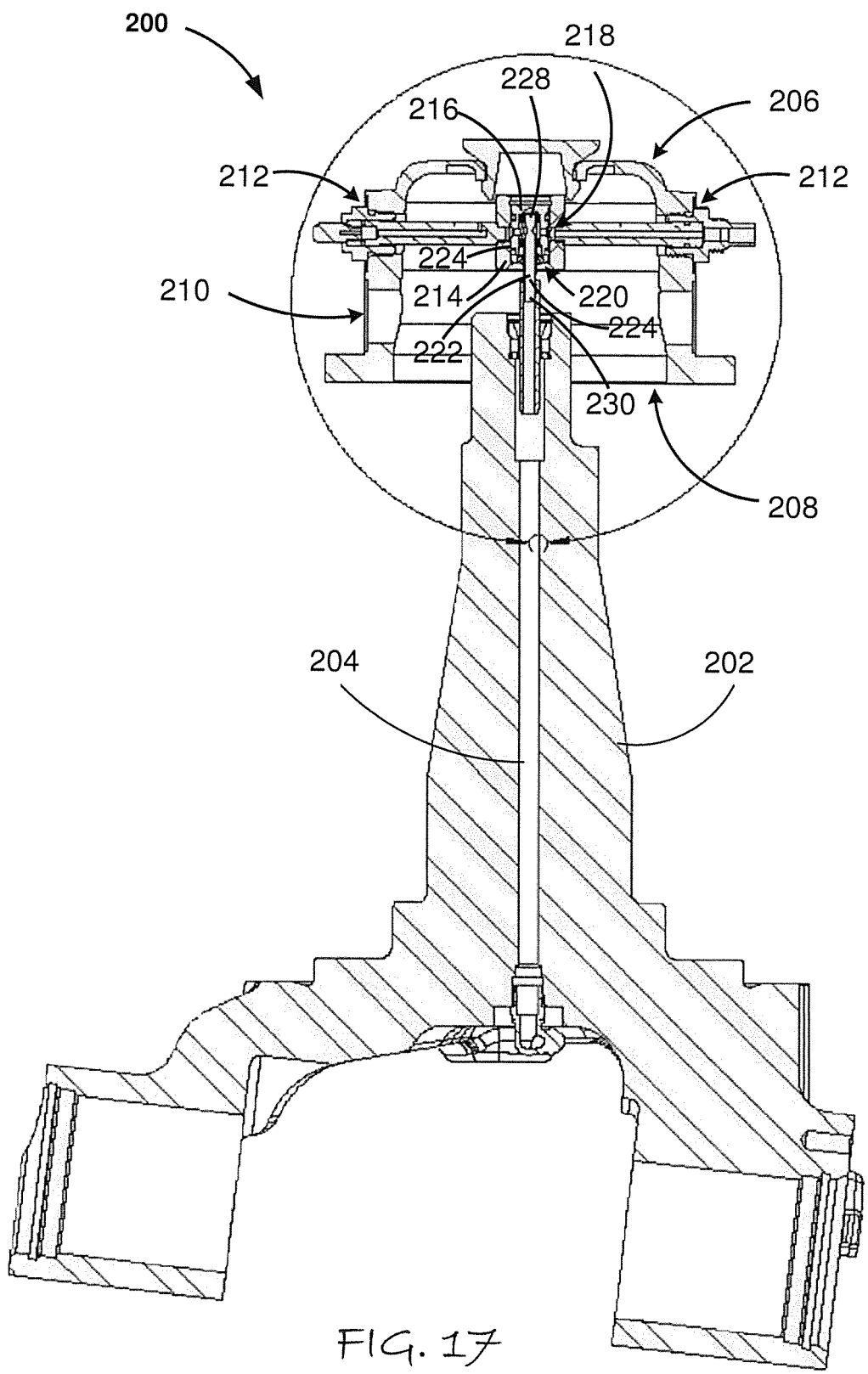
FIG. 17 is a cross-section view of a steer axle tire pressure management system.

FIG. 17 shows a preferred embodiment of a steer axle tire pressure management system 200 that preferably includes a steer spindle 202, enclosing a pressurized fluid within a spindle fluid channel 204, and a hubcap 206. The hubcap 206 is in communication with the steer spindle 202, having an interior 208, an exterior 210, and a plurality of bulkhead ports 212. The bulkhead port 212 provides access from the interior 208, of the hubcap 206, to the exterior 210 of the hubcap 208.

The preferred embodiment of a steer axle tire pressure management system 200 further includes a rotary union 214, which is axially aligned with the steer spindle 202, and mounted to the hubcap 206, from the interior 208, of the hubcap 206. The rotary union 214, is in fluidic communication with the pressurized fluid confined by the spindle fluid channel 204. In the preferred embodiment, the rotary union 212, includes a bearing sleeve 216, adjacent the interior 208, of the hubcap 206. The bearing sleeve provides a fluid distribution channel 218, and a center cavity 220 (also referred to herein as central bore), which provides an internal surface 220.

Preferably, preferred embodiment of a steer axle tire pressure management system 200, further includes a fluid conduit 222 supported by the bearing sleeve 216. The fluid conduit 222 provides an internal surface 224, an external surface 226, a downstream end 228, and an upstream end 230. The downstream end 228, of the fluid conduit 222, is secured to the bearing sleeve 216.

Figure 18:
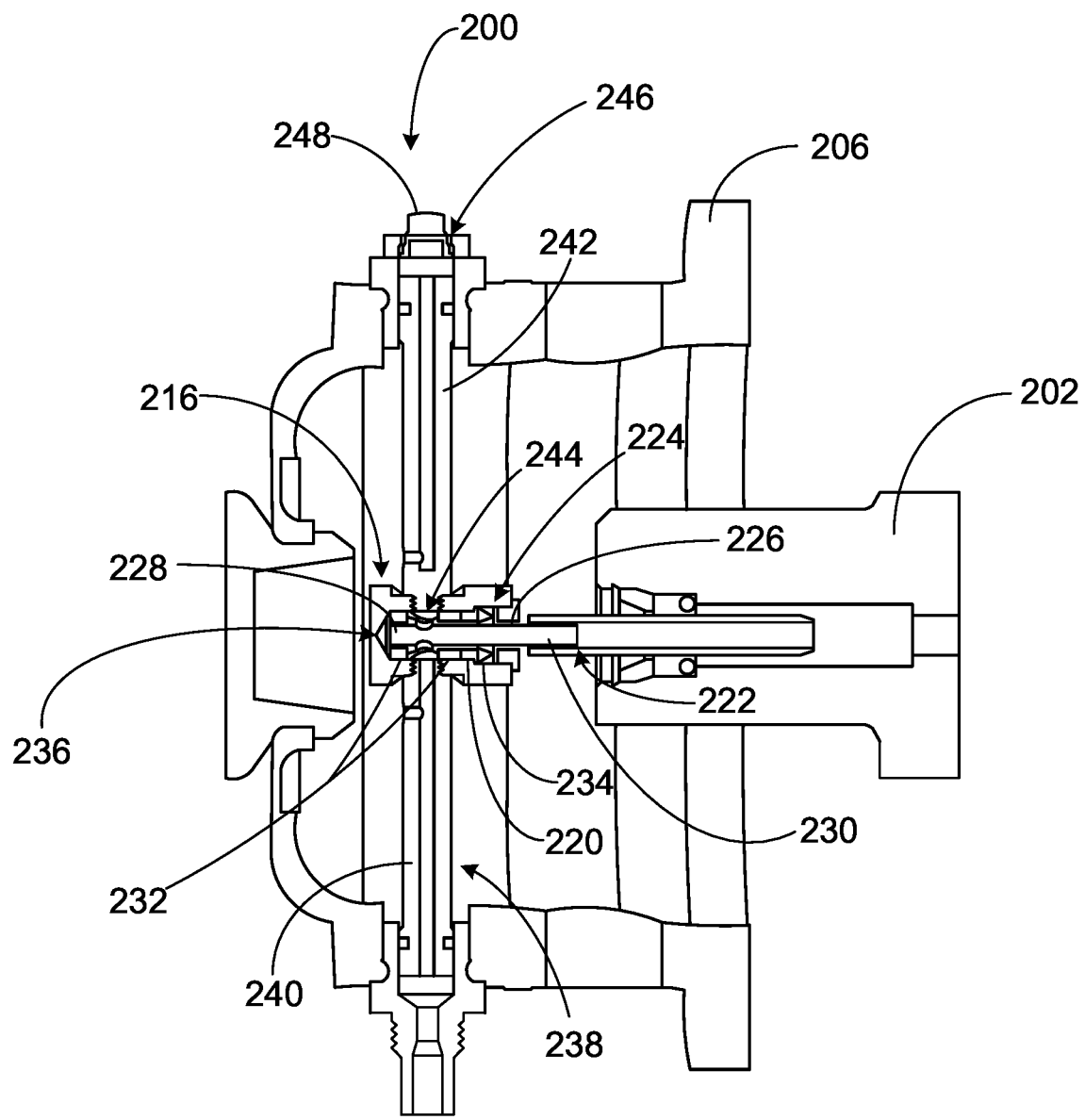
FIG. 18 is a cross sectional view in elevation of a hubcap and rotary union of the steer axle tire pressure management system of FIG. 1.

As shown by FIG. 18, the bearing sleeve 216 houses a pair of bearings 232, each of the pair of bearings 232, provides an inner race and an outer race, each inner race of the pair of bearings 232, are in non-sliding contact adjacency with the external surface 226, of the fluid conduit 222. Further, each outer race of the pair of bearings 232, are in pressing communication with the internal surface 224, of the bearing sleeve 216, a first bearing of the pair of bearings is adjacent the downstream end 228, of the fluid conduit 222, and a second bearing of the pair of bearings 232, is adjacent the upstream end 230, of said fluid conduit 222.

Further shown by FIG. 18, is a pair of fluid seals 234 and 236. The pair of fluid seals 234 and 236, each engage an external surface of the fluid conduit 222, and the center cavity 220, of the bearing sleeve 216. A support web 238 disposed between the bearing sleeve 216, and the bulkhead port 212. The support web preferably provides at least an air delivery web member 240 (also referred to herein as a first spoke), and a pressure relief web member 242 (also referred to herein as a second spoke). The air delivery web member 240, conveys pressurized air confined by the spindle fluid channel 204 (of FIG. 17), and passed through transfer port 244 (of FIG. 20), which are adjacent the downstream end 228, of said fluid conduit 222, to a tire secured to the steer axle 202. The pressure relief web member 242, maintains the internal air pressure within the hubcap 206, at or below atmospheric pressure by way of a one way pressure valve 246. The present embodiment of the steer axle tire pressure management system 200, preferably further includes a filter medium 248, secured to the pressure relief web member 242.

Figure 19:
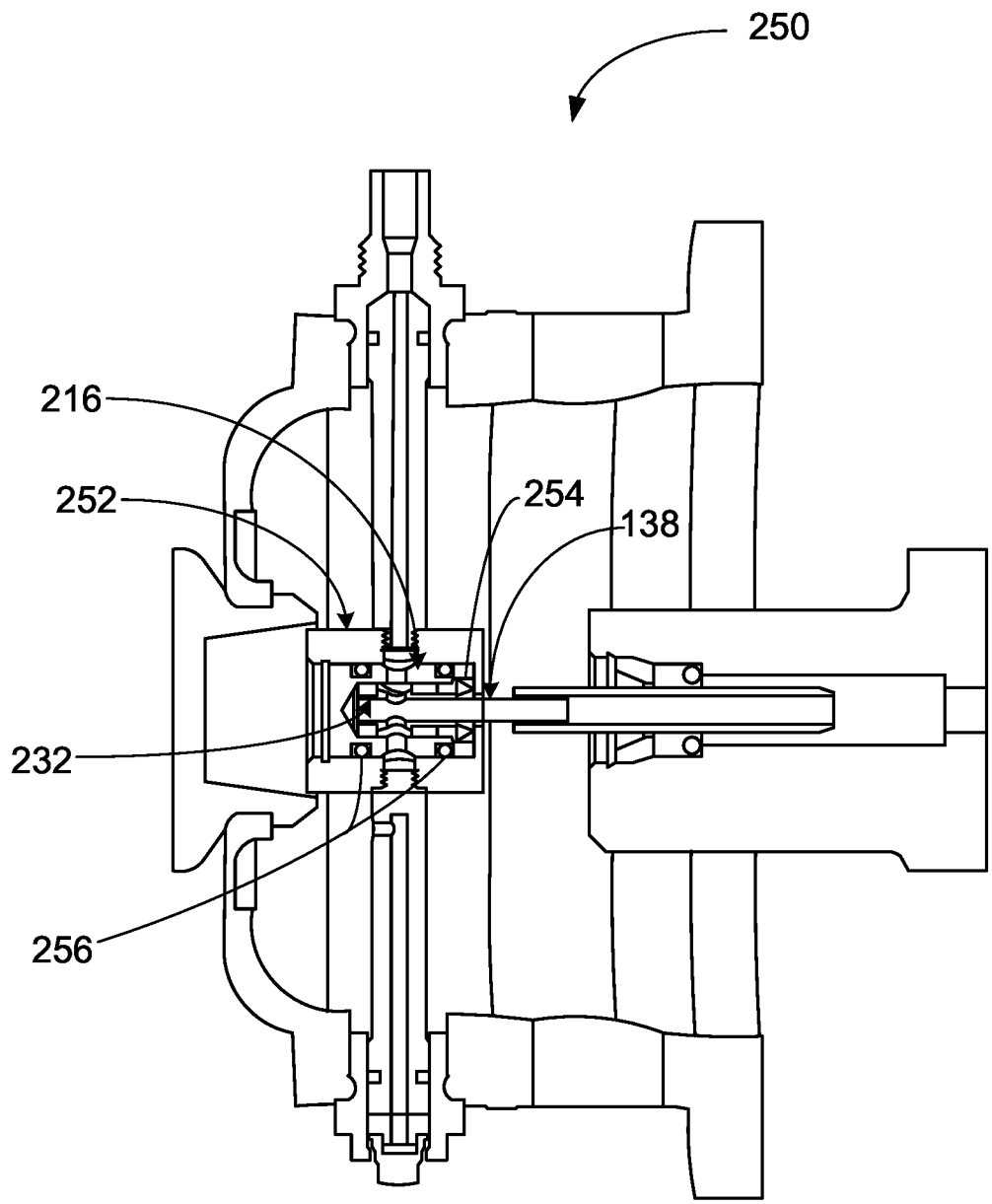
FIG. 19 is a cross sectional view in elevation of an alternate embodiment of the hubcap and rotary union of the steer axle tire pressure management system of FIG. 18.

FIG. 19 shows an alternate embodiment of a steer axle tire pressure management system 250, which introduces a rotary union housing 252, supporting the bearing sleeve 216. FIG. 19 further shows a rotary seal 254, and a pair of air seals 256. The rotary seal 254, is adjacent a corresponding bearing of the pair of bearings 232, while each of the pair of air seals 256, are disposed between the bearing sleeve 216, and the rotary union housing 252. The rotary seal 254, confine pressurized air within the bearing sleeve 216, while the pair of air seals 256 preclude pressurized air from escaping into the interior 208, of the hubcap 206.

Figure 20:
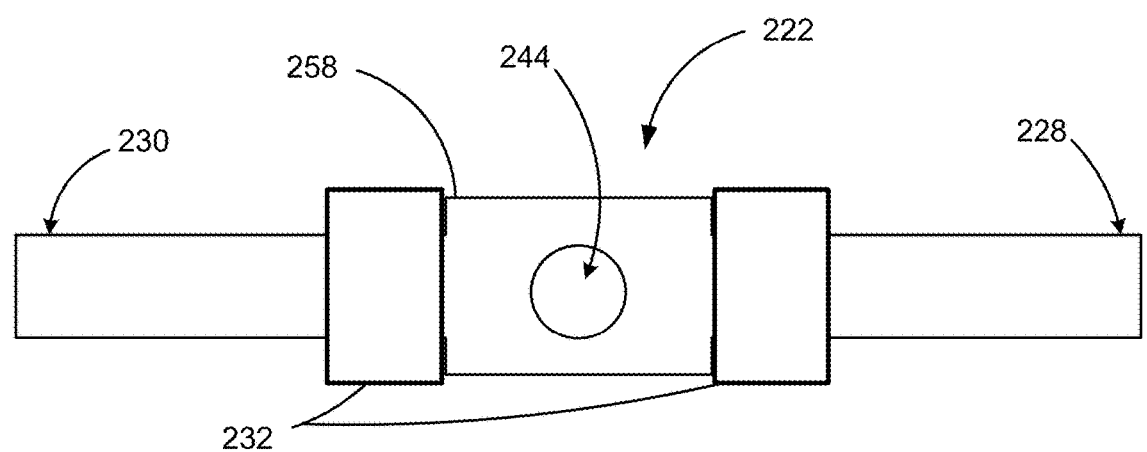
FIG. 20 is a side view in elevation of a fluid conduit of the steer axle tire pressure management system of FIG. 19.
Figure 21:
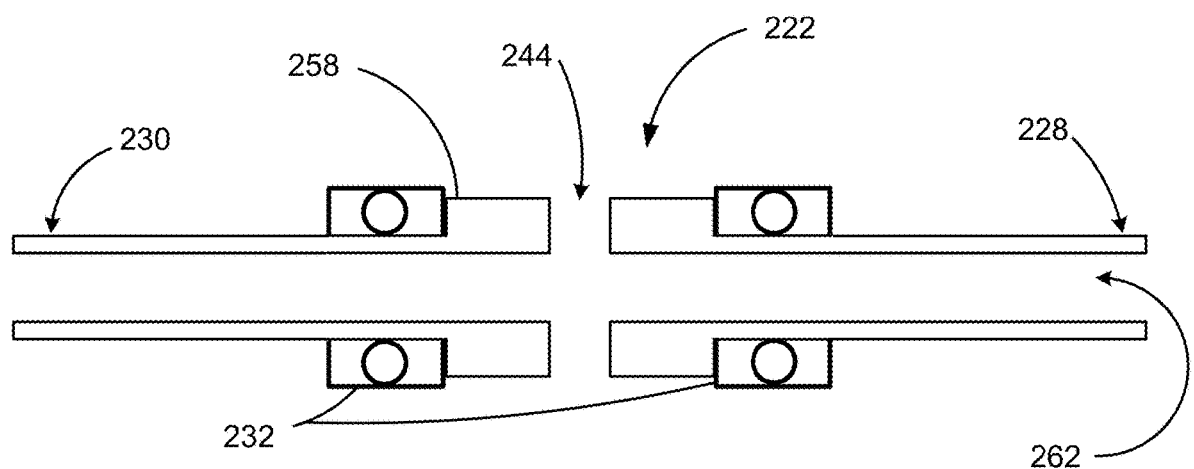
FIG. 21 is a cross sectional view in elevation of the fluid conduit of FIG. 20.

FIG. 20 shows a view in elevation, of the fluid conduit 222, that provides a bearing shoulder 258, which provides spacing between the pair of bearings 232, while FIG. 21 provides a cross section view, in elevation, of the fluid conduit 222, of FIG. 20. In a preferred embodiment, each bearing of the pair of bearings 232, are pressed onto the fluid conduit 222, with each inner race of each bearing of the pair of bearings 232, resting in contact adjacency with the bearing shoulder 258. One of the bearings of the pair of bearings 232, being introduced onto the fluid conduit 222, from the upstream end 228, of the fluid conduit 222, and the other bearing of the pair of bearings 232, being introduced onto the fluid conduit 222, from the downstream end 230, of the fluid conduit 222.

FIG. 21 shows a cross-sectional view in elevation of the fluid conduit 222, which provides an opening 260. The opening 260 conducts the pressurized fluid from the steer spindle 202, through a fluid channel 262, of the fluid conduit 222, and out the transfer port 244, of the fluid conduit 222.

Figure 22:
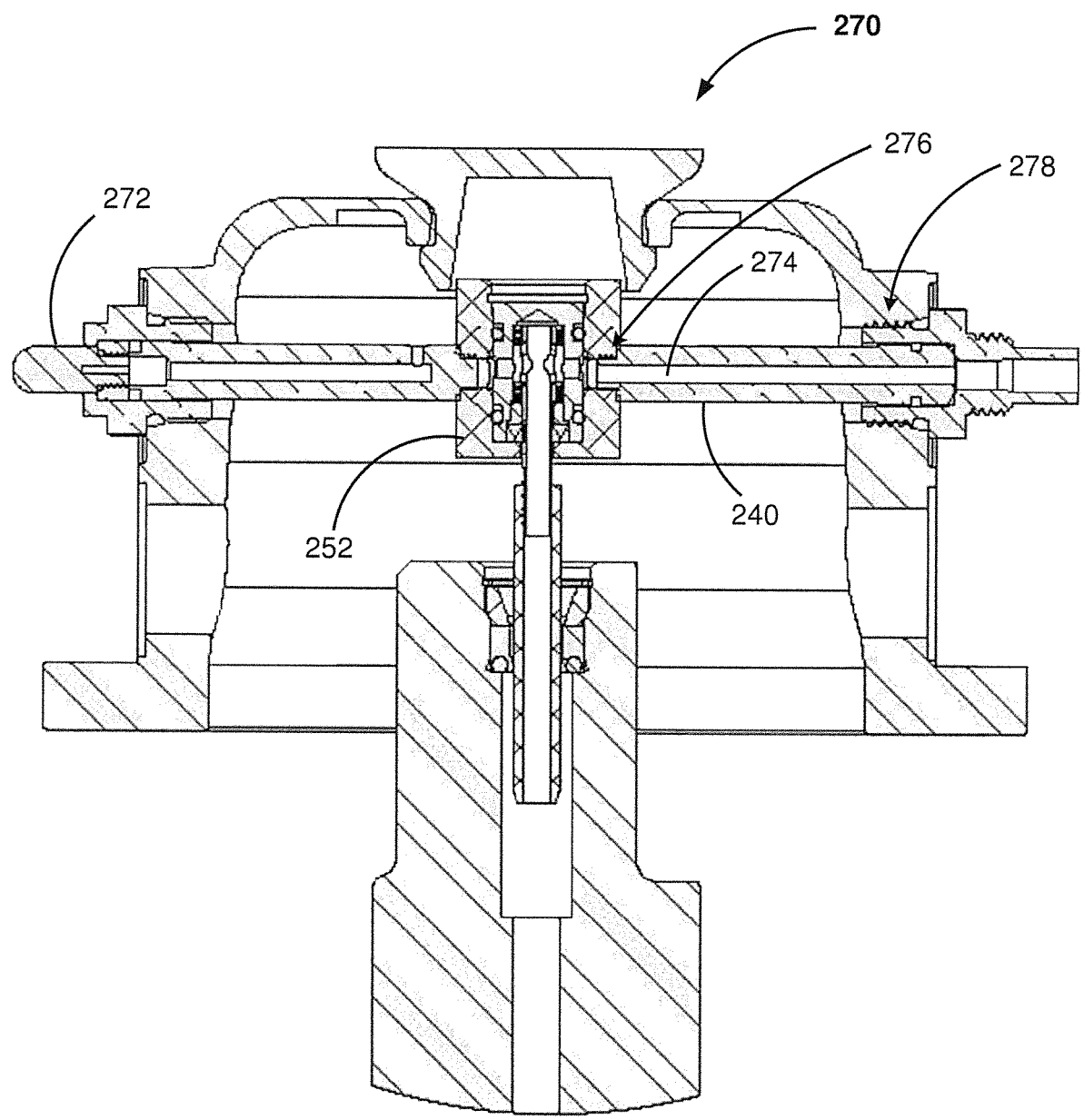
FIG. 22 is a cross sectional view in elevation of an alternative embodiment of the hubcap and rotary union of the steer axle tire pressure management system of FIG. 19.

An alternative embodiment of a steer axle tire pressure management system 270, is provided by FIG. 22. The alternate embodiment introduces a one way valve 272, (such as a duck bill one way valve from Spectra, of Philadelphia Pa.) into the alternate embodiment of a steer axle tire pressure management system 250, of FIG. 19. FIG. 19 further shows that the first spoke 240, provides a fluidic channel 274, the fluidic channel 274, conducts pressurized fluid from a fluidic pathway 276, of the rotary union housing 252, to a first bulkhead port 278, of the bulkhead ports 212, of FIG. 18.

Figure 23:
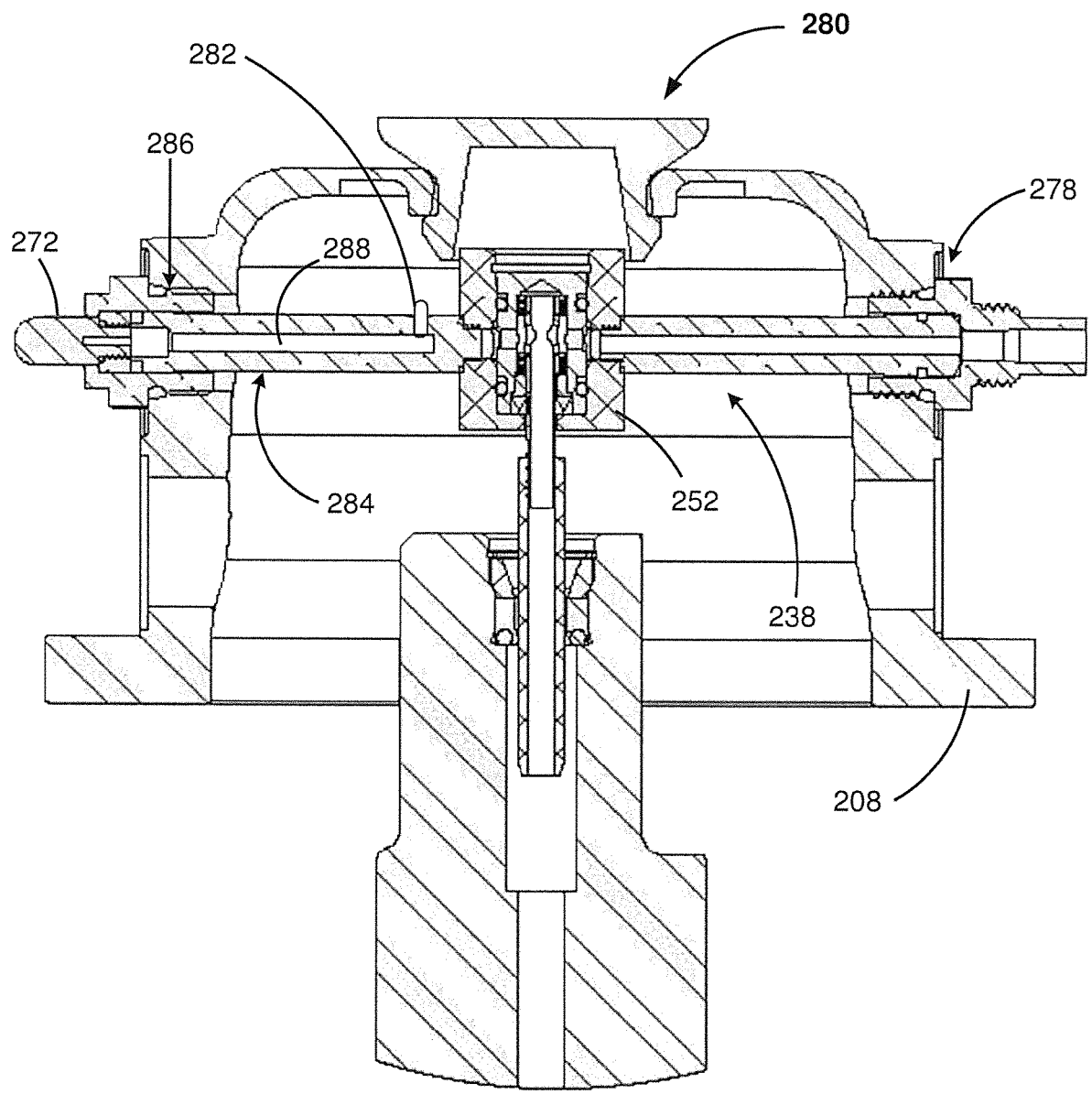
FIG. 23 is a cross sectional view in elevation of an alternate alternative embodiment of the hubcap and rotary union of the steer axle tire pressure management system of FIG. 19

An alternate alternative embodiment of a steer axle tire pressure management system 280, is provided by FIG. 23. The alternate alternative embodiment 280, introduces a second one way valve 282, (such as a duck bill one way valve from Spectra, of Philadelphia Pa.) into the alternate embodiment of the steer axle tire pressure management system 270, of FIG. 22. The second pressure relied valve 282, is adjacent the rotary union housing 252. The second pressure relief valve 282 mitigates entry of an oil, present within the interior of the hub cap, into a pressure relief channel 288, of the second spoke 284.

FIG. 23 further shows the support web 238, provides a second spoke 284. The second spoke 284, communicates with and is disposed between the rotary union housing 252, and a second bulkhead port 286. Again, the second spoke 284, provides the pressure relief channel 288, which is in fluidic communication between an environments confined within the interior of said hub cap to an environment communicating with the exterior of said hub cap. It is further noted that the first pressure relief valve 272, mitigates entry of debris present in said environment exterior to said hub cap 208, into pressure relief channel 288.

Figure 24:
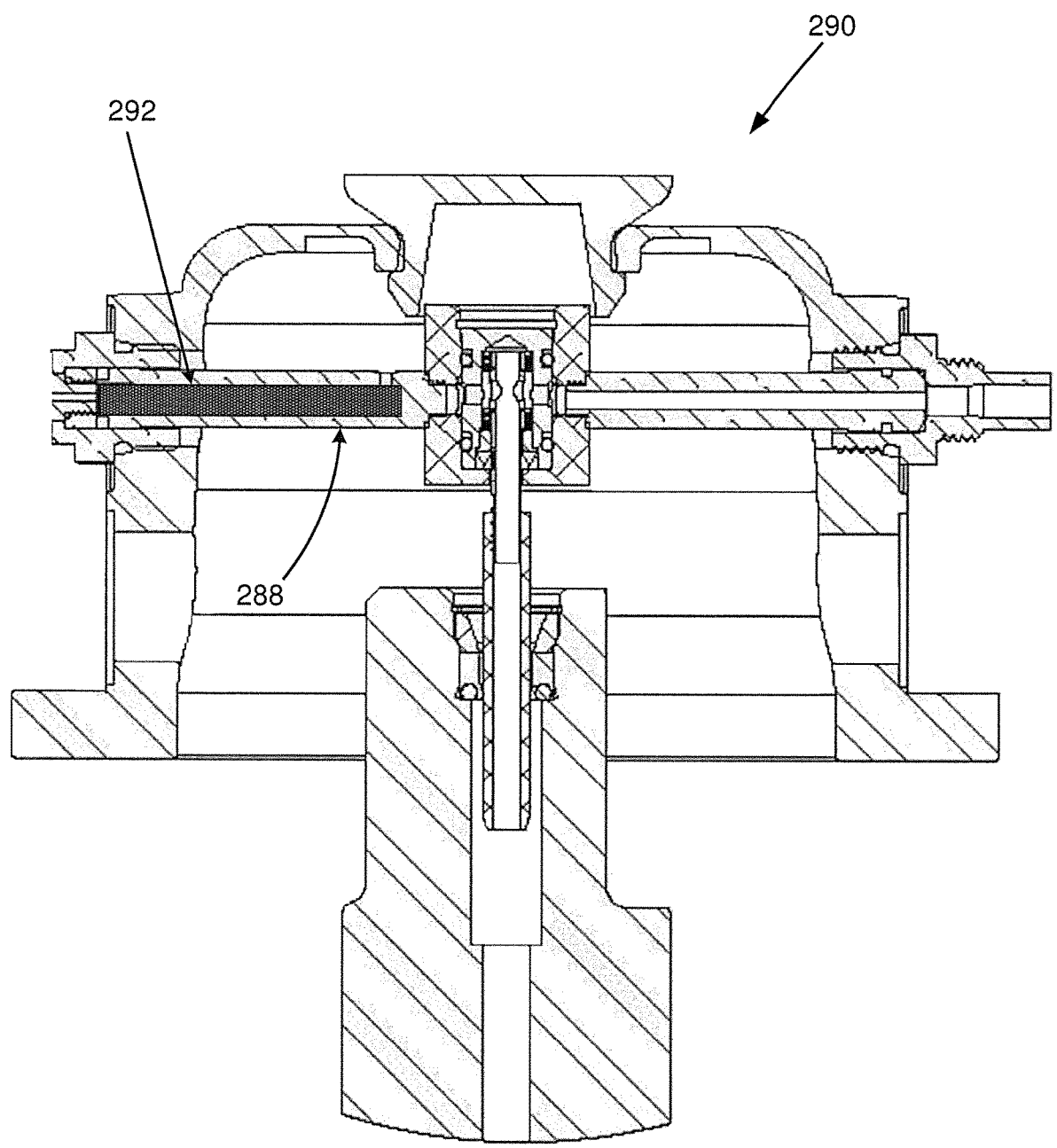
FIG. 24 is a cross sectional view in elevation of a further embodiment of the hubcap and rotary union of the steer axle tire pressure management system of FIG. 19

FIG. 24 shows an additional embodiment of the present invention 290, in which the pressure relief channel 288, houses a filter medium 292. The filter medium 292, maintains pressure equalization between the environment confined within the interior of said hub cap and the environment communicating with the exterior of said hub cap. The filter medium 292 further promotes the transfer of air, while mitigating the transfer of dirt and water into the interior of the hub cap and the transfer of an oil from the environment confined within the interior of said hub cap and the environment communicating with the exterior of said hub cap.

In a preferred embodiment, the filter medium 292, is a fibrous material such as a spun brass material, or a flashspun high-density polyethylene fiber, and the rotary union housing 252, is formed from a polymer.

As will be apparent to those skilled in the art, a number of modifications could be made to the preferred embodiments which would not depart from the spirit or the scope of the present invention. While the presently preferred embodiments have been described for purposes of this disclosure, numerous changes and modifications will be apparent to those skilled in the art. Insofar as these changes and modifications are within the purview of the appended claims, they are to be considered as part of the present invention.

What is claimed is:

1. A steer axle tire pressure management system comprising:
   a steer spindle enclosing a pressurized fluid;
   a hubcap, the hubcap in communication with the steer spindle, the hubcap provides an interior, an exterior, and a bulkhead port, the bulkhead port provides access from the interior of the hubcap to the exterior of the hubcap; and
   a rotary union axially aligned with the steer spindle and mounted to the hubcap from the interior of the hubcap, the rotary union in fluidic communication with the pressurized fluid, the rotary union comprising:
   a rotary union housing, the rotary union housing provides at least a fluid distribution channel and a central bore, the central bore provides an internal surface;
   a bearing sleeve adjacent the internal surface of the central bore;
   a fluid conduit, the fluid conduit having an internal surface, an external surface, a downstream end and an upstream end, the fluid conduit supported by the bearing sleeve;
   a pair of bearings, each of the pair of bearings provides an inner race and an outer race, each inner race of the pair of bearings in non-sliding contact adjacency with the external surface of the fluid conduit, each outer race of the pair of bearings in pressing communication with an internal surface of the bearing sleeve, a first bearing of the pair of bearings adjacent the downstream end of said fluid conduit, and a second bearing of the pair of bearings adjacent the upstream end of said fluid conduit;
   a pair of fluid seals, the pair of fluid seals each engage an external surface of said bearing sleeve as well as said internal surface of said central bore; and
   a support web disposed between said rotary union housing and said bulkhead port, said rotary union housing provides a fluidic pathway.

2. The steer axle tire pressure management system of claim 1, in which said bulkhead port is a first bulkhead port, said hubcap further provides a second bulkhead port, and in which said support web provides a first spoke, said first spoke communicating with and disposed between said rotary union housing and said first bulkhead port, and further in which said fluid conduit is in fluidic communication with said pressurized fluid of said steer spindle, said fluid conduit provides an opening, said opening conducts said pressurized fluid from said steer spindle to said fluidic pathway of said rotary union housing.

3. The steer axle tire pressure management system of claim 2, in which said first spoke provides a fluidic channel, the fluidic channel conducts said pressurized fluid from said fluidic pathway of said rotary union housing to said first bulkhead port.

4. The steer axle tire pressure management system of claim 3, in which said support web provides a second spoke said second spoke communicating with and disposed between said rotary union housing and said second bulkhead port, and further in which said second spoke provides a pressure relief channel, said pressure relief channel provides a fluidic communication pathway from an environment confined within the interior of said hub cap to an environment communicating with the exterior of said hub cap.

5. The steer axle tire pressure management system of claim 4, further comprising a pressure relief valve secured to the exterior of the hub cap, and in fluidic communication with the fluid communication pathway, said pressure relief valve precludes said environment confined within said hub cap to rise above a predetermined level of pressure.

6. The steer axle tire pressure management system of claim 5, in which said pressure relief valve is a first pressure relief valve, and further comprising a second pressure relief valve, said second pressure relied valve is adjacent said rotary union housing and in fluidic communication with said fluid communication pathway, said second pressure relief valve mitigates entry of an oil, present within the interior of the hub cap, into the fluid communication pathway.

7. The steer axle tire pressure management system of claim 6, in which the first pressure relief valve mitigates entry of debris present in said environment exterior to said hub cap into said fluid communication pathway.

8. The steer axle tire pressure management system of claim 4, further comprising a filter medium disposed within said fluid communication pathway, said filter medium maintains pressure equalization between said environment confined within the interior of said hub cap and said environment communicating with the exterior of said hub cap.

9. The steer axle tire pressure management system of claim 8, in which said filter medium promotes the transfer of air while mitigating the transfer of dirt and water into the interior of the hub cap.

10. The steer axle tire pressure management system of claim 9, in which said filter medium is a fibrous material.

11. The steer axle tire pressure management system of claim 10, in which said fibrous material is a flashspun high-density polyethylene fiber.

12. The steer axle tire pressure management system of claim 1, in which said support web is attached to said rotary union housing, and further in which said rotary union housing is formed from a polymer.

13. The steer axle tire pressure management system of claim 1, in which said fluid conduit provides a shoulder disposed between said downstream end and said upstream, in which said shoulder facilitates separation between said pair of bearings.

14. The steer axle tire pressure management system of claim 13, in which said bulkhead port is a first bulkhead port, said hubcap further provides a second bulkhead port, and in which said support web provides a first spoke, said first spoke communicating with and disposed between said rotary union housing and said first bulkhead port, and further in which said fluid conduit is in fluidic communication with said pressurized fluid of said steer spindle, said fluid conduit provides an opening, said opening conducts said pressurized fluid from said steer spindle to said fluidic pathway of said rotary union housing.

15. The steer axle tire pressure management system of claim 14, in which said first spoke provides a fluidic channel, the fluidic channel conducts said pressurized fluid from said fluidic pathway of said rotary union housing to said first bulkhead port.

16. The steer axle tire pressure management system of claim 15, in which said support web provides a second spoke said second spoke communicating with and disposed between said rotary union housing and said second bulkhead port, and further in which said second spoke provides a pressure relief channel, said pressure relief channel provides a fluidic communication pathway from an environment confined within the interior of said hub cap to an environment communicating with the exterior of said hub cap.

17. The steer axle tire pressure management system of claim 16, further comprising a pressure relief valve secured to the exterior of the hub cap, and in fluidic communication with the fluid communication pathway, said pressure relief valve precludes said environment confined within said hub cap to rise above a predetermined level of pressure.

18. The steer axle tire pressure management system of claim 17, in which said pressure relief valve is a first pressure relief valve, and further comprising a second pressure relief valve, said second pressure relied valve is adjacent said rotary union housing and in fluidic communication with said fluid communication pathway, said second pressure relief valve mitigates entry of an oil, present within the interior of the hub cap, into the fluid communication pathway.

19. The steer axle tire pressure management system of claim 18, in which the first pressure relief valve mitigates entry of debris present in said environment exterior to said hub cap into said fluid communication pathway.

20. The steer axle tire pressure management system of claim 16, further comprising a filter medium disposed within said fluid communication pathway, said filter medium maintains pressure equalization between said environment confined within the interior of said hub cap and said environment communicating with the exterior of said hub cap.

* * * * *